(12) United States Patent
Hatti et al.

(10) Patent No.: US 12,386,601 B2
(45) Date of Patent: *Aug. 12, 2025

(54) EXTENSIBLE COMPILATION USING COMPOSITE PROGRAMMING FOR HARDWARE PERFORMANCE ENHANCEMENTS

(71) Applicant: CuraeChoice, Inc., Charlestown, WV (US)

(72) Inventors: Eashan Krishna Hatti, Charlestown, WV (US); Harsha Mysore Hatti, Charlestown, WV (US)

(73) Assignee: CuraeChoice, Inc., Charlestown, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,475

(22) Filed: Nov. 20, 2023

(65) Prior Publication Data

US 2024/0303055 A1    Sep. 12, 2024

Related U.S. Application Data

(63) Continuation of application No. 18/167,448, filed on Feb. 10, 2023, now Pat. No. 11,822,908.

(51) Int. Cl.
G06F 8/41        (2018.01)
(52) U.S. Cl.
CPC .................................. G06F 8/4434 (2013.01)
(58) Field of Classification Search
CPC .................................................... G06F 8/4434
USPC ........................................................ 717/153
See application file for complete search history.

(56) References Cited

U.S. PATENT DOCUMENTS

| | | | |
|---|---|---|---|
| 6,516,305 B1 | 2/2003 | Fraser | |
| 10,402,731 B1 * | 9/2019 | Cosic | A63F 13/55 |
| 10,503,775 B1 | 12/2019 | Ranzinger | |
| 11,822,908 B1 * | 11/2023 | Hatti | G06F 8/423 |

(Continued)

OTHER PUBLICATIONS

Ruben Fiszel, "Staged meta-programming, new LMS frontend and computation graphs", 2017, retrieved from https://rubenfiszel.github.io/posts/lms/2017-01-05-LMS-semester-project.html, 21 pages. (Year: 2017).*

(Continued)

*Primary Examiner* — Ted T. Vo
(74) *Attorney, Agent, or Firm* — Haynes and Boone, LLP

(57) ABSTRACT

Systems, methods, and machine-readable media are disclosed for enabling high-performance programming via a composite programming language that gives programmers complete control over the compilation process. The composite programs include two language levels: an object program level (source code), and a metaprogram level that describes how a compiler should be customized in order to optimize the source code for a target hardware environment. When an augmented compiler receives a composite program, it recognizes the metaprogram and implements the one or more parameters specified within the composite program to optimize the compiler for a given target. Once the augmented compiler has been, it proceeds with compiling the source code included in the composite program. The compiled code is then output as machine language and may be executed by one or more computing systems.

20 Claims, 6 Drawing Sheets

(56) References Cited

U.S. PATENT DOCUMENTS

2019/0179796 A1 6/2019 Lakhman
2022/0383131 A1 12/2022 Baker

OTHER PUBLICATIONS

Wikipedia, "Monomorphization", 2021, retrieved from https://web.archive.org/web/20211104111405/https://en.wikipedia.org/wiki/Monomorphization , 2 pages. (Year: 2021).*
Martin Bravenboer, Exercises in Free Syntax, 2008, Thesis, Utrecht University, Netherlands, 251 pages.
Lilis et al., An inegrated implementation framework for compile-time metaprogramming, 2013, John Wiley & Sons, Ltd., pp. 727-763.
Nicolas Vasilache et al., Composable and Modular Code Generation in MLIR, 2022, Google, 43 pages.

* cited by examiner

EXTENSIBLE COMPILATION USING COMPOSITE PROGRAMMING FOR HARDWARE PERFORMANCE ENHANCEMENTS

CROSS-REFERENCE TO RELATED APPLICATION(S)

This application is a continuation of U.S. application Ser. No. 18/167,448, filed Feb. 10, 2023, the entire disclosure of which is hereby incorporated herein by reference in its entirety.

TECHNICAL FIELD

The present description relates to generally to extensible computer code compilation. More specifically, the present description relates to systems and methods for enabling high-performance programming via a composite programming language that gives programmers complete control over the compilation process.

BACKGROUND

Computer code compilation is performed by a compiler that typically is, from the perspective of the programmer, a black box. The programmer is not required to know how the internals of the compiler works; instead, the programmer simply inputs a program written in a programming language and outputs an executable. Moreover, typically a programmer is not allowed any control over how any internal operations of the compiler work. The general expectation is that a programmer will focus on what the program at issue will do, as opposed to how it will execute on a given computer system. Because of this, programmers focus only on the program being written, ignoring how the program will be transformed into an executable by the compiler.

Problems arise, however, because this focus on the "what" of a program being written to the expense of the "how" the program is executed results in sub-optimal performance of the executable. High-level programming languages (compared to the lowest level of computer language, binary), while they enable complex abstractions, require that these abstractions be reduced to a minimum for high performance. But black box compilers, even when an optimizing compiler, are not built to deal with every abstraction that can appear in the higher-level programming languages. Thus, as programmers develop new abstractions, black box compilers cannot keep up with optimizations for these abstractions for all of the different hardware platforms on which the compiled executable may run.

This lack of customizability in black box compilers is a problem that prevents optimal performance of the programs that programmers write. Accordingly, there is a need for solutions that provide more control over the compilation process to maximize program performance.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method includes receiving, by a computing device, a composite computer program, the composite computer program comprising first code instructions at an object program level and second code instructions at a metaprogram level. The method further includes customizing, by the computing device, a compiler with one or more optimization instructions contained in the second code instructions. The method further includes compiling, by the computing device, the first code instructions using the customized compiler to produce an optimized set of machine code for the computing device. The method further includes executing, by the computing device, the optimized set of machine code.

In an additional aspect of the disclosure, a computing device includes a memory containing machine readable medium comprising machine executable code having stored thereon instructions for performing a method of implementing a composite computer program, the composite computer program comprising first code instructions at an object program level and second code instructions at a metaprogram level. The computing device further includes a processor coupled to the memory, the processor configured to execute the machine executable code to cause the processor to receive the composite computer program. The processor is further configured to customize a compiler of the computing device with one or more optimization instructions contained in the second code instructions. The processor is further configured to compile the first code instructions using the customized compiler to produce an optimized set of machine code for the computing device. The processor is further configured to execute the optimized set of machine code.

In an additional aspect of the disclosure, a non-transitory computer-readable medium having program code recorded thereon, the program code comprising code for causing a computing device to receive a composite computer program, the composite computer program comprising first code instructions at an object program level and second code instructions at a metaprogram level. The program code further comprises code for causing the computing device to customize a compiler with one or more optimization instructions contained in the second code instructions. The program code further comprises code for causing the computing device to compile the first code instructions using the customized compiler to produce an optimized set of machine code for the computing device. The program code further comprises code for causing the computing device to execute the optimized set of machine code.

Other aspects will become apparent to those of ordinary skill in the art upon reviewing the following description of exemplary embodiments in conjunction with the figures. While one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

The present disclosure is best understood from the following detailed description when read with the accompanying figures.

DETAILED DESCRIPTION

Figure 1:
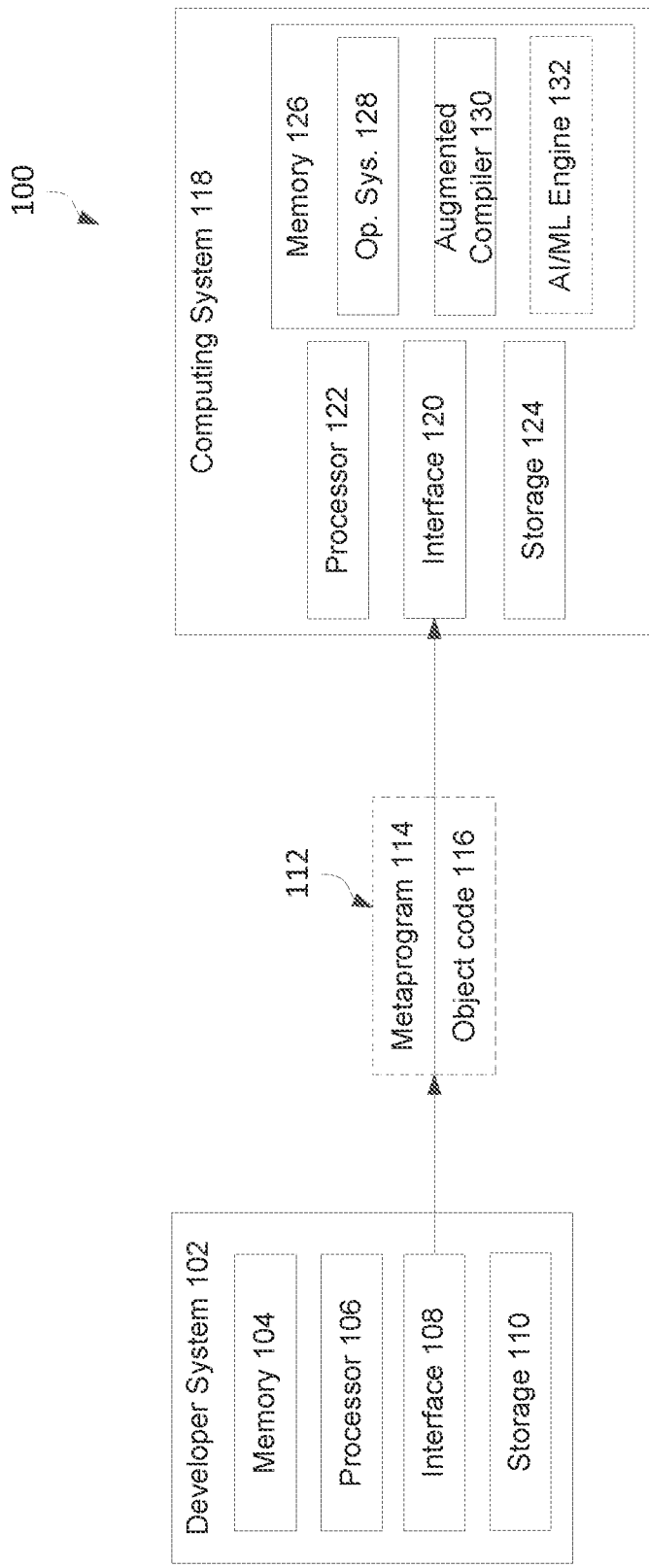
FIG. 1 illustrates an exemplary computing environment for implementing extensible compilation using a composite program according to some embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for enabling high-performance programming via a composite programming language that gives programmers complete control over the compilation process. The composite programs produced according to embodiments of the present disclosure include two language levels: an object program level, also referred to as object code or source code herein, and a logic level, or metaprogram level, that describes how a compiler should be customized in order to optimize the object code for a given hardware environment and/or objective. In contrast to black box compilers that do not allow customizations, embodiments of the present disclosure include augmented compilers that have been augmented to recognize the metaprograms included in composite programs as described herein.

When an augmented compiler receives a composite program, it recognizes the metaprogram and implements the one or more parameters specified within the composite program in order to optimize the compiler for a given hardware target(s). Once the augmented compiler has been customized as specified by the metaprogram, the augmented compiler proceeds with compiling the object code that was also included in the composite program. The compiled code is then output as machine language and may be executed by the computing system (or stored/cached for execution by the same computing system later and/or one or more other computing systems).

Embodiments of the present disclosure provide multiple advantages and benefits. The two-level programming language, and corresponding composite programs resulting from that language, include two levels—a metaprogram level and an object code level. The metaprogram level allows a programmer to specify how to customize a compiler in order to compile the object code (the source code) in a manner that maximizes performance of the compiled code on one or more target machines. That is, embodiments of the present disclosure enable the production of compiled code that executes on the hardware of computing devices in more efficient manners, taking advantage of specific hardware configurations' strengths by specifying parameters via the metaprograms that can achieve those advantages via compilation. Further, embodiments of the present disclosure enable the implementation of nondeterminism within a compiler (which is executing on a computing device), which allows the compiler to produce all possible results of a combination of optimizations, prune the results to locate the best combination of optimizations, and use those optimizations to compile code for the targeted hardware. This enables avoidance of the phase-ordering problem that other compilers are subject to. Thus, embodiments of the present disclosure not only improve the operation of the compiler with the use of metaprograms that allow the compiler to optimize for targeted hardware; it also enables the more efficient operation of the hardware itself when executing the code compiled accordingly.

In particular, embodiments of the present disclosure provide a novel programming language where the compiler is open and customizable/extensible, in contrast to prior black box approaches. Every aspect of the compiling process can be controlled by the programmer for a given program via the present embodiments. This is accomplished by making the compiler itself programmable. Embodiments of the present disclosure enable programmers to not only write the programs which are compiled, but also write the programs that perform compilation on the programs being compiled. This is referred to herein as composite programming. Thus, the programmer writes a composite program that includes two levels—one level that supports logic programming, also referred to as the "metaprogram" herein, and another level that supports object programming (the high-level program language for the program itself). This facilitates nearly all of the compiler being written by the programmers themselves.

As one example for sake of illustration, consider a programmer using a typical black box compiler, working with a single type of hardware where the program will execute which is known. If the programmers using the black box compiler write a kind of program the compiler was not built to compile efficiently, then the compiler will struggle to compile the program, eventually producing an executable that performs suboptimally. In contrast, a programmer using composite programming according to embodiments of the present disclosure will write their program as the object level. If the compiler being used is not built to efficiently compile the kind of program the programmer is writing, the programmer will simply write a metaprogram (the logic level) that focuses on compiling this kind of program for maximum performance. The programmer integrates this metaprogram into the rest of the compiler, seamlessly giving the compiler the new capabilities implemented via the metaprogram for the object level program.

As another example, embodiments of the present disclosure may also be extended to situations where a compiler is desirably modified to work with new kinds of hardware (either for general compatibility and/or optimized performance). A programmer using a general black box compiler would not be able to take advantage of the specific attributes and strengths of the new kind of hardware to obtain best performance of a compiled program (an executable). Instead, using the black box compiler a programmer would at best use a generic compilation method which works for various kinds of hardware but does not take advantage of each hardware's unique strengths. In contrast, a programmer using composite programming according to embodiments of the present disclosure may write a metaprogram that focuses on the hardware the programmer is working with, compiling the object-level program while taking advantage of as many unique strengths of the hardware as possible or desired. Whenever the programmer encounters a new kind of hardware they want to target for a program, the programmer may write a metaprogram that the augmented compiler integrates and uses whenever the new kind of hardware is targeted.

FIG. 1 illustrates an exemplary computing environment 100 for implementing extensible compilation using a composite program according to some embodiments of the present disclosure. The computing environment 100 may include, among other things, a developer system 102, a composite program 112, and a computing system 118 for compiling the composite program 112 and potentially executing the compiled program. The developer system 102 may communicate with the computing system 118 (e.g., including the composite program 112 among other data) via a network. The network may be, for example, the Internet, a local area network, a wide area network, and/or a wireless network (to name a few examples). The network may include a variety of transmission media including cables, optical fibers, wireless routers, firewalls, switches, gateways, and/or other devices to facilitate communications between one or more of the aspects of the computing environment 100.

The developer system 102 includes computer hardware and software that a software developer (also referred to herein as a programmer or user) uses to write the composite program 112. As illustrated, the developer system 102 includes memory 104, processor 106, interface 108, and storage 110. These elements may be in direct or indirect communication with each other, for example via one or more buses. The memory 104 may include a cache memory (e.g., a cache memory of the processor 106), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 104 includes a non-transitory computer-readable medium. The memory 104 may store, or have recorded thereon, instructions that, when executed by the processor 106, cause the processor 106 to perform the operations described herein with respect to writing composite programs according to aspects of the present disclosure. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 106 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 106 may also be implemented as a combination of computing devices, e.g., a combination of a DSP and a microprocessor, a plurality of microprocessors, multicore processors, one or more microprocessors in conjunction with a DSP core, or any other such configuration.

The interface 108 may include a communication device such as a transceiver, transmitter, receiver, a modem and/or network interface card to facilitate exchange of data with external devices of any kind, such as for example computing system 118. The network via which the exchange of data may be facilitated includes, for example, an Ethernet connection, a digital subscriber line (DSL), a telephone line, coaxial cable, a cellular telephone system, etc. The storage 110 may represent any number of storage devices for storing data. In various examples, the storage 110 may include HDDs, SSDs, and/or any other suitable volatile or non-volatile data storage medium. The storage 110 may store various systems and programs, including for example an operating system (e.g., a multitasking operating system) that is loaded into the memory 104 upon initialization of the developer system 102 or at some other time.

The operating system running in memory 104 includes one or more source code development environments with which a programmer may write source code. Source code may refer to a human-readable form of a computer program, which is typically at a higher "level" (e.g., a higher level of abstraction) than the machine code (e.g., binary) for a program actually implemented by a computer processor. Just a few examples of source code languages include C. C++, C#, Rust, Mobius, Python, Ruby on Rails, Java, JavaScript, PHP, etc. According to embodiments of the present disclosure, such source code includes composite programs, such as exemplary composite program 112. Composite program 112 is illustrated with two parts—metaprogram 114 and object code 116. Object code 116 is a representation of the source code that the programmer writes via the source code development environment on developer system 102. The metaprogram 114 is supported at a logic level, while the object code 116 is supported at the object level for high-level functional programming (though a functional language is not essential).

Figure 4:
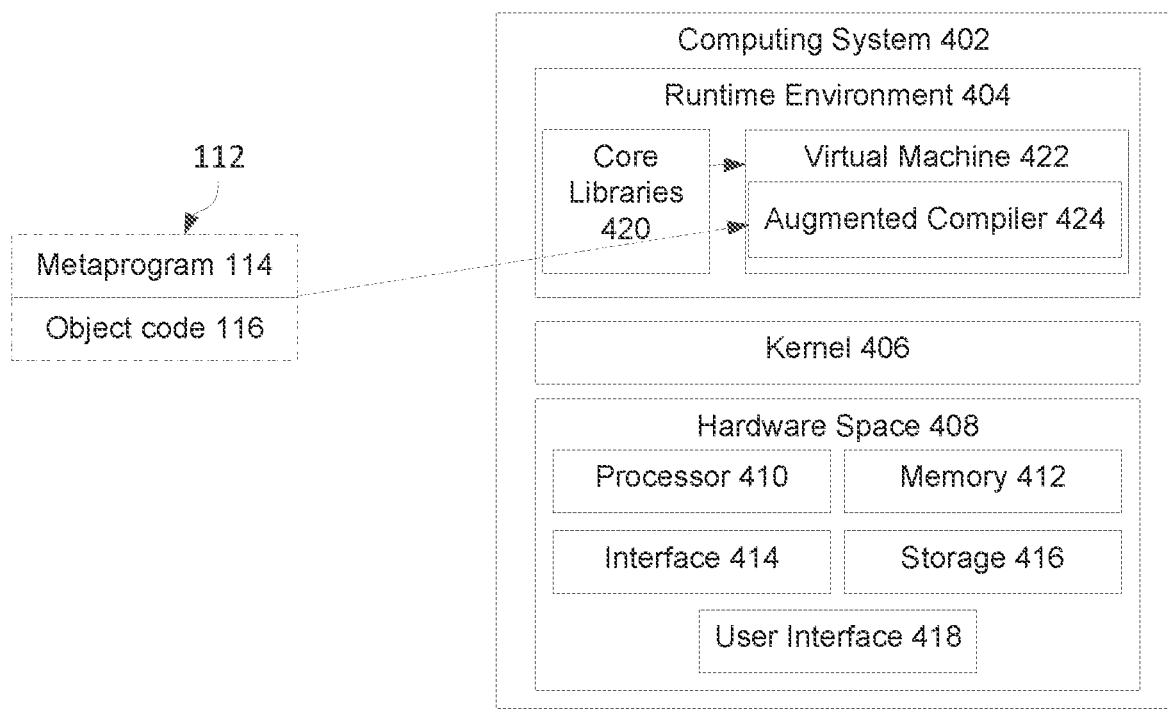
FIG. 4 illustrates an exemplary computing environment for implementing extensible compilation using a composite program according to some embodiments of the present disclosure.
Figure 5:
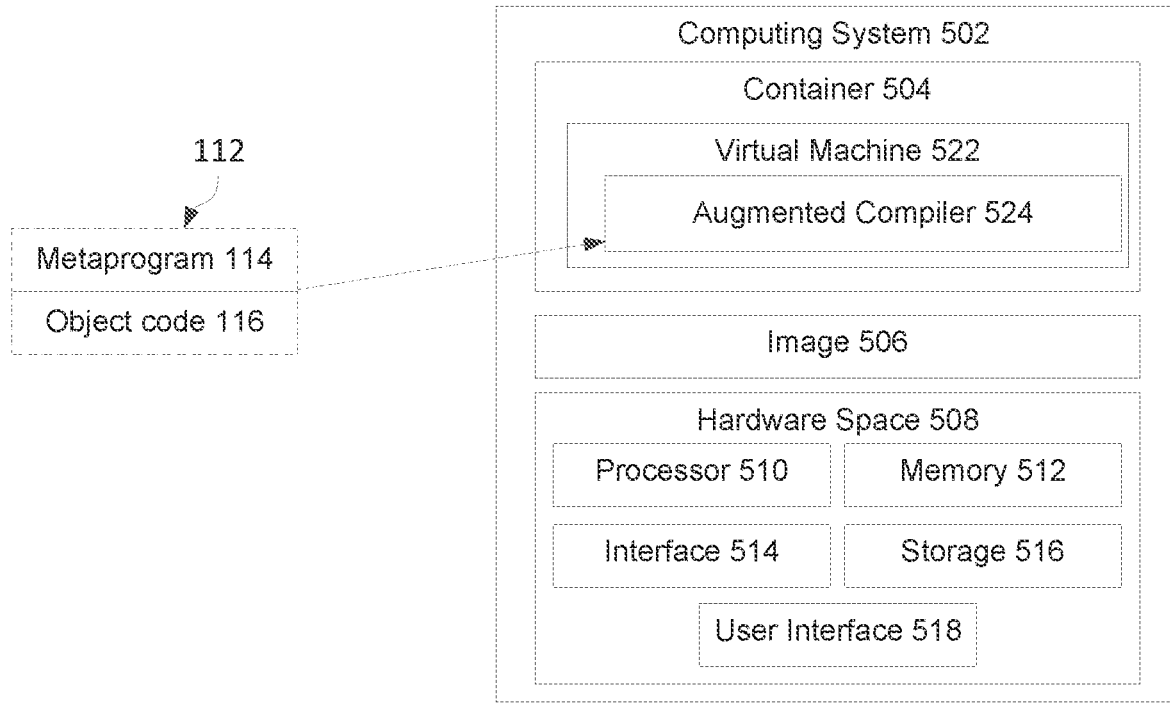
FIG. 5 illustrates an exemplary computing environment for implementing extensible compilation using a composite program according to some embodiments of the present disclosure.

The developer system 102 uses the interface 108 to transmit the composite program 112 to the computing system 118. Computing system 118 is representative of a compiling and/or code execution environment for the composite program 112. Thus, while developer system 102 and computing system 118 are illustrated as separate physical entities, these could also be part of the same computing system (e.g., the developer writing a composite program may cause the same computing system to also compile the source code and/or execute the compiled executable). Embodiments of the present disclosure are applicable in a variety of environments and situations. In addition to compilation and/or execution of the source code (e.g., object code 116, under optimizations directed by metaprogram 114) by the developer system 102 (where the developer system 102 and the computing system 118 are the same), the composite program 112 may be sent to a variety of different types of systems. This includes a physically separate system, illustrated as computing system 118, such as a different computer and/or server. Other examples are illustrated in FIGS. 4 and 5, and include cloud environments operating with full virtual machines and/or containers.

As illustrated in FIG. 1, computing system 118 (which, as noted above, may be the same system as developer system 102 or different therefrom) may include an interface 120, processor 122, storage 124, and memory 126. Examples for these elements are similar to those discussed above with respect to developer system 102, and are thus not repeated here. Further, the memory 126 may include an operating system 128 (again, such as discussed above), an augmented compiler 130, and an Artificial Intelligence/Machine Learning (AI/ML) engine 132 during operation of the computing system 118.

The augmented compiler 130 may begin as an off-the-shelf compiler that is augmented to be able to recognize instructions and information specified in the metaprogram 114, and is hence referred to herein as an augmented compiler 130. Some exemplary aspects of the augmented compiler 130 are further illustrated with respect to FIGS. 2 and 3, discussed further below. For example, an interpreter for metaprograms (e.g., 114) may be embedded within an existing compiler (or any other type of compiler). This may be embedded, for example, after a front end of a compiler (e.g., after front end 302 of FIG. 3 below). In such an example, the compiler would take a metaprogram and an unoptimized object program, input the object program into the metaprogram and execute the metaprogram, and thereby output the optimized object program (after completing any other stages of the compiler). However implemented, the augmented compiler 130, upon receipt of a metaprogram 114, becomes customized and optimized for a given hardware and/or software platform(s) based on the information specified within the metaprogram 114. The augmented compiler 130, so customized based on the information in the metaprogram 114, compiles the object code 116 into an executable (such as machine code). In other examples, the augmented compiler 130 may be fully specified by the metaprogram 114—that is, instead of a compiler existing already on the target computing system, the metaprogram 114 is the compiler that will compile the object code 116 at the target computing system. Examples described herein will be discussed with reference to the augmented compiler 130 as resident already on the computing system in question for sake of ease of illustration.

The computing system 118 may also include an AI/ML engine 132. This is illustrated in dashed lines because this is an optional element of the computing system 118 (and/or developer system 102). Where included, the AI/ML engine 132 may be used to further modify one or more parameters of an augmented compiler 130 according to embodiments of the present disclosure. For example, the metaprogram 114 when received by computing system 118 may include one or more inputs that the augmented compiler 130 incorporates for compiling. The augmented compiler 130 will then compile the object code 116 in a manner optimized according to the metaprogram 114 (e.g., for a given hardware environment for execution, etc.). In this situation, the AI/ML engine 132 may analyze the compiled code output and, based on one or more analytical passes made on the output, make one or more changes to the metaprogram 114 being implemented by the augmented compiler 130. The augmented compiler 130 may then implement the changes and re-compile the object code 116. The AI/ML engine 132 may continue iterating through changes until a desired level of optimization is achieved for the given object code 116 for a given target (e.g., a targeted hardware environment).

As another example, the AI/ML engine 132 may analyze the information specified in the metaprogram 114 before the metaprogram 114 is implemented in the augmented compiler 130. In such examples, instead of the metaprogram 114 specifying one or more particular parameters to be implemented by the augmented compiler 130, the metaprogram 114 may identify one or more outcome goals for compiled code by the augmented compiler 130. In such situations, the AI/ML engine 132 may apply one or more analytics on the specified outcome goals to determine what parameter(s) to modify for the augmented compiler 130. The AI/ML engine 132 may use as data inputs the information included with the metaprogram 114, one or more parameters about the hardware environment(s) targeted, one or more parameters about the augmented compiler, as well as past data from other compiled code, to name a few examples. Further, the AI/ML engine 132 may implement one or more algorithms to achieve its results, such as linear regression, logistical regression, decision tree, support vector machine (SVM), naïve Bayes, K-nearest neighbors, K-means, random forest algorithm, etc., including those existing now and in the future.

Where the AI/ML engine 132 is not included, a developer/programmer may assess the performance of compiled code in a target environment and manually modify one or more parameters specified within the metaprogram 114 (e.g., via the development environment at developer system 102). For example, a developer may implement a just-in-time (JIT) compilation for the augmented compiler 130 (which may include, in some examples, the developer system 102 performing a first compilation of the source code into an intermediate representation, such as byte code, as the object code 116). The developer may compile the object code 116 (the byte code) via JIT compilation in the augmented compiler 116, assess the performance results, and made modification(s) to the metaprogram 114 and then JIT compile the byte code again with the modifications to the metaprogram 114 being implemented by the augmented compiler 130. As a result, the program written by a developer may achieve much higher performance with the compiled code based on what is specified by the metaprogram 114.

These optimizations allow embodiments of the present disclosure to address the current issues facing developers between the use of high-level programming (abstractions) and program performance impacted by black box compilers. While high-level languages enable complex, pervasive abstractions, high performance demands these abstractions be reduced to a minimum. Thus, an optimizing compiler is relied upon as part of a high-level language that seeks to accomplish both goals. However, even the most sophisticated optimizer in a black box compiler can fall short when presented with abstractions it was not built to deal with. As programmers develop new abstractions, a choice must be made between (1) augmenting the optimizer to deal with new abstractions; (2) abandon performance in exchange for high-level programming; and (3) abandon high-level programming in exchange for performance.

Options 2 and 3 are not attractive, since one of high-level programming and program performance is abandoned. Option 1 is attractive because it would allow programs to be both high-level and high-performance. However, Option 1 has shortcomings. For example, as a language's library ecosystem grows, so does the number of abstractions that programmers will use. If these abstractions are to be performant, the optimizer must be extended with new optimizations to target them, or these abstractions must rely on existing general-purposes optimizations. However, neither of these options are ideal. The latter option is often not as effective as needed. Because the optimizations are general, they often will fail to fire on code for difficult to diagnose reasons. Coaxing them to fire often involves construing code into a less readable and less maintainable form, which is a loss of high-level programming.

Extending the optimizer with new optimizations to target new abstractions is even less attractive for several reasons. First, it presents too significant of an effort for the compiler developers. The library ecosystem of popular languages can be enormous, with an example programming language's package index having over ninety thousand entries. Implementing optimizations for even just the most widely used ones poses a significant challenge. Second, updates to libraries can break optimizations. For instance, an optimization which depended upon a library's application programming interface (API) will have to be reimplemented or dropped entirely when that API changes. This again increases the workload for the compiler developers—it requires them to go back and update the compiler to facilitate these new optimizations. If they do not, performance suffers. And, third, compiler developers may not have the domain-specific knowledge to implement optimizations for a library. A library and its optimizations may be complex. Requiring compiler developers to be familiar with the complexity of many libraries again increases the workload to an intolerable amount.

Because the option to rely upon existing general-purpose optimizations in black box compilers is not an option, the extending of the optimizer with new optimizations is chosen in practical cases. Thus, the language becomes more high-level, yet the optimizer and, as a result, program performance falls behind. Programmers are again confronted with a choice between high-level programming and high-performance programs. Taking all of this into account, it makes sense why, despite their shortcomings, options 2 and 3 are often chosen. Option 1 would be valuable, but costly to implement.

This is why, according to embodiments of the present disclosure, a novel programming language and augmented compiler is provided that results in composite programs with two levels, as illustrated by composite program 112. Option 1 is thus made viable—embodiments of the present disclosure enable library developers to easily extend the language of the object code 116 with new optimizations themselves. Such optimizations are simply implemented as metaprograms (e.g., metaprogram 114 of composite program 112). This allows the optimization workload to be taken off the compiler developers' hands and given to the library developers, which typically includes a much larger set of people who can specialize in each problem domain. Because of this, optimizations can be much more effective while also being much more numerous.

To facilitate this, embodiments of the present disclosure use logic programming in a novel way. The approach lies splits programming into two fragments or levels, one level supporting logic programming (the meta level), the other supporting high-level functional programming (the object level). This is illustrated by the composite program 112. Optimizations are implemented in the former fragment as metaprograms 114. Basing the approach in a split of the programming (e.g., based on two-level type theory, or 2LTT) allows it to cleanly separate these two levels using types—it is essentially two languages that look and feel like one language. With regard to implementing optimizations, the meta level (metaprogram 114) may be based in λProlog (as one example) to allow metaprograms 114 to be written declaratively, avoid issues such as the phase-ordering problem, deal with variable binding easily, automatically expose equalities between programs, be easily extensible, etc. Thus, embodiments of the present disclosure reconcile high-level programming and high-performance by giving users complete and easy control over the optimization and compilation process.

Figure 2:
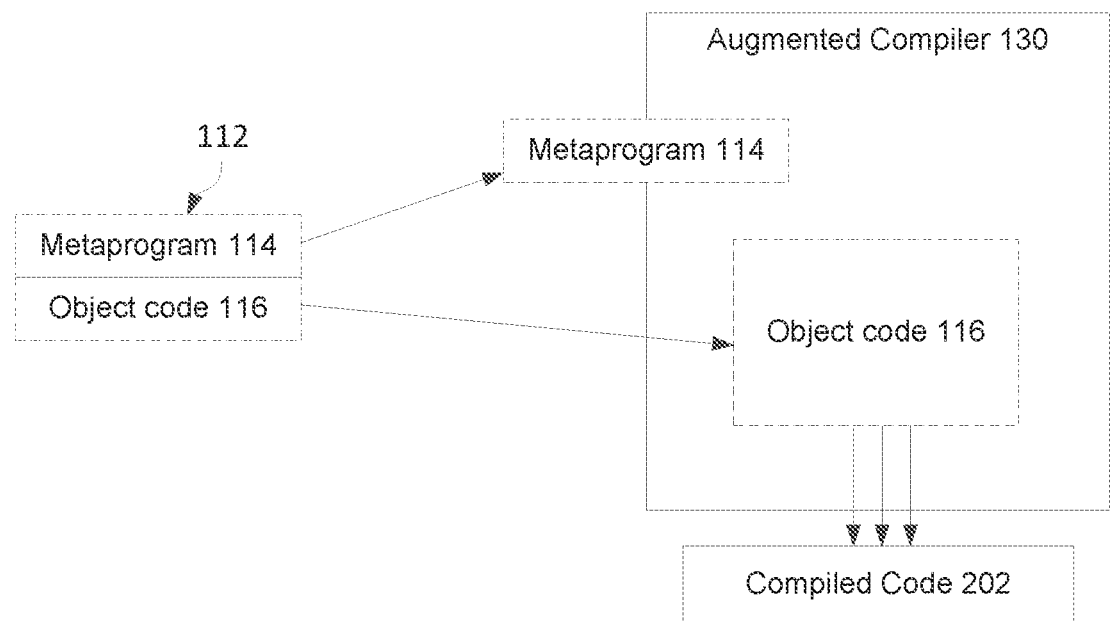
FIG. 2 illustrates an example of extensible compilation of object code according to some embodiments of the present disclosure.

Turning now to FIG. 2, an example of extensible compilation of object code is illustrated according to embodiments of the present disclosure. When a computing system, such as computing system 118, receives a composite program 112 (e.g., via interface 120 of FIG. 1), the augmented compiler 130 running on computing system 118 receives the composite program 112 and implements follows. The augmented compiler 130, which has been augmented to recognize the metaprogram 114, incorporates the metaprogram into the compiler 130 which optimizes the compiler in the manner specified/desired from the metaprogram 114. Once the metaprogram 114 is integrated into the rest of the augmented compiler 130, the augmented compiler 130 proceeds to compile the object code 116 with the optimizations/capabilities implemented per the metaprogram 114. The augmented compiler 130 outputs the compiled code 202 (e.g., machine code, an executable). The compiled code 202 may then be executed by one or more computing systems, such as computing system 118, for which the metaprogram 114 enabled the compiler to compile the object code 116 to take advantage of the specific attributes and strengths of the hardware.

Figure 3:
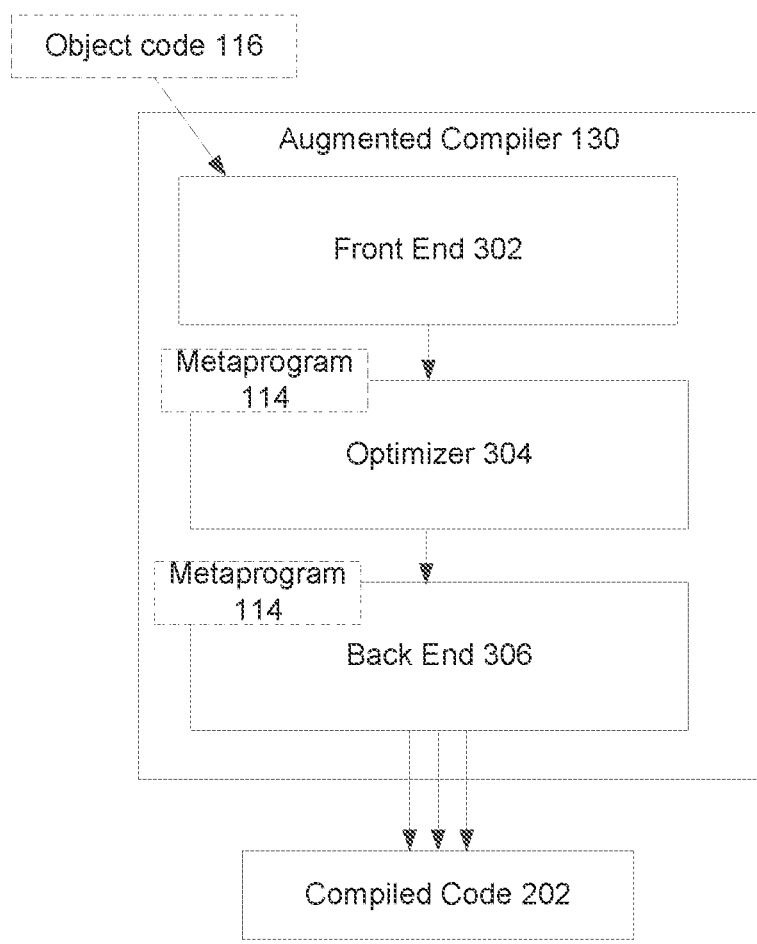
FIG. 3 illustrates an exemplary augmented compiler with a composite program according to some embodiments of the present disclosure.

An exemplary block diagram of some of the components of a compiler, such as augmented compiler 130, is illustrated in FIG. 3. As illustrated, the augmented compiler 130 includes generally a front end 302, an optimizer 304, and a back end 306. Object code 116 is input into the compiler 130 beginning with the front end 130, and passes through each block before becoming compiled code 202.

Front end 302 is used to understand the language in which the object code 116 is found. For example, the front end 302 may include multiple components in order to understand the language, verify correctness of the input object code 116, and produce information that is used for subsequent steps at the optimizer 304 and back end 306. The output of the front end 302 is typically an intermediate representation of the object code 116 and one or more symbol tables. Some examples of front end 302 components may include a scanner, a parser, an analyzer (e.g., a semantic analyzer), and/or an intermediate representation conversion component.

A scanner (e.g., a lexical analyzer) may be used to divide the object code 116 into numbers, operators, and words. The scanner may search for patterns, such as a sequence of characters, that can be combined to forma lexeme. Each lexeme may represent a pattern in the object code 116. The scanner may convert the object code 116's stream of characters into a stream of tokens (e.g., a lexeme-tag pair), with tokens produced for symbols relevant to the parser. For example, whitespace is not relevant typically to a parser, and therefore is removed since the token would not reference it. Other examples of actions performed as part of a scanner include removing comments, expanding macros (for applicable languages, such as C), check indentation and create relevant tokens, etc. The scanner may be concerned with case sensitivity/insensitivity, the significance of blanks, the significance of new lines, and nesting of comments if possible.

A parser, which is designed to know the fundamental rules of the language(s) used for the object code 116, may be used to detect classes and functions. The parser may process the tokens received from the scanner and form a syntax tree (e.g., an abstract syntax tree) for each expression, in order to store expressions identified by the parser. The syntax tree may include nodes and a root, with the nodes furthest from the root being processed first. When constructing this tree, the parser may ensure operator precedence. While scanning and parsing are described separately, they may also be combined (or, at least having lexical and syntactic rules mixed together). For example, the scanner and parser may be combined into one step with no need for two pass parsing.

An analyzer (e.g., a semantic analyzer) is used to check legality rules, including verifying the tree(s) produced by the parser (or scanner/parser combination). This includes performing type inferencing, function overload selections, and template resolution where applicable. The analyzer may resolve identifier references, insert cast operations for implicit coercions, etc. Different languages may have different legality rules. For example, a Java-like language may include rules about such things as multiple declarations of a variable within a scope, referencing a variable before its declaration, referencing an identifier that has no declaration, access violation, how many arguments to include in a method call, and type mismatches.

An intermediate representation conversion component may produce a flow graph (e.g., made up of tuples grouped into basic blocks), as a simplified representation of the program of object code 116. The intermediate representation of the object code 116 will produce the same result as the source code of object code 116. For example, the intermediate representation may be the static single assignment form, which is produced by converting each set of nodes in the tree into a single operation. In general, the intermediate representation may assume any form of abstraction used by the compiler to store code as it is being processed.

The optimizer 304 is the component of the augmented compiler 130 that is used to improve the efficiency of the program, and according to embodiments of the present disclosure, may have one or more customizations according to what is specified in the metaprogram 114. The optimizer 304 may precompute static content, eliminate branches when a specific case is proven not to occur, among many other types of optimizations, both static in the compiler 130 already and those added specifically via metaprogram 114 (and/or customization of existing optimizations with one or more parameters specified via metaprogram 114). Further examples may include substituting complex operations for simpler operations, optimization of loops, data lifetime, as well as myriad different hardware-specific optimizations specified by the metaprogram 114. Again, the result of optimization will produce the same result as the original object code 116.

The back end 306 converts the intermediate representation, after optimization, into the target output—in this illustration, the compiled code 202 (e.g., machine code or byte code, depending on the language, hardware, user preferences etc.). For example, the back end 306 may compile the intermediate representation into machine code that is optimized for a target architecture, according to what is specified by the metaprogram 116 (including not only optimizations for optimizer 304, but also for compiling by back end 306 for the target architecture(s)). In some examples, the compiled code 202 may be byte code that can be JIT compiled at another system. In other examples, the compiled code 202 is machine code (whether JIT compiled or not).

Yet further, there may be multiple augmented compilers 130 that may operate on the object code 116. For example, one augmented compiler 130 at an intermediate (or the original) computing system may compile the object code 116 of a composite program 112 to an intermediate representation such as byte code, and may make that byte code available to yet another augmented compiler 130 for compilation to machine code. In some examples, both compilers are augmented and able to implement customizations according to the metaprogram 114 of the composite program (e.g., either both implementing the same metaprogram 114 or the intermediate compiler producing a new metaprogram 114 that is able to specifically integrate with the final compiler to result in machine code). In other examples, just the intermediate compiler may implement the metaprogram 114 and the final compiler is a black box compiler (e.g., a JIT compiler).

While the above discussion identified the optimizer 304 and back end 306 as the component(s) that may be customized according to what is specified in the metaprogram 114 (and as illustrated with the metaprogram 116 in dashed lines partially overlapping elements 304 and 306), the metaprogram 114 may also specify customization(s) for the front end 302, and/or any one or more of the different components of the augmented compiler 130. In general, any one or more components of the front end 302, optimizer 304, and back end 306 may be augmented so that they may recognize metaprogram 114 so that the specified customizations may be incorporated as appropriate into the relevant elements of the augmented compiler 130.

The discussion above has been with respect to general computing system 118 implementing the augmented compiler 130. Some exemplary use cases of embodiments of the present disclosure are illustrated in FIG. 4 (a virtual machine environment) and FIG. 5 (a containerized environment). This is for simplicity of discussion only. Aspects of the present disclosure are applicable to executables generally, such as virtual machine executables, uniform resource locator (URL) implementations where the URL receives some argument to perform a requested action (e.g., a URL to a REST API), a script, a compiled executable, etc.

Looking at FIG. 4 first, a computing system 402 is illustrated with respect to a virtual machine environment. The computing system 402 includes a software stack with runtime environment 404 and kernel 406, which is executing in an operating environment provided by the hardware space 408. The hardware space 408 includes at least processor 410, memory 412, interface 414, storage 416, and user interface 418. These elements may all be interconnected by one or more system buses. Examples for the processor 410, memory 412, interface 414, and storage 416 are similar to those discussed above with respect to developer system 102, and are thus not repeated here. The user interface 418 may include one or more peripherals that enable interaction between a user and the computing system 402. For example, user interface 418 may include a display, a mouse, a touchscreen, a keyboard, speakers, a microphone, and/or other peripherals.

The software stack includes one or more user processes that execute over a runtime environment 404 having components executing on kernel 406. Kernel 406 manages the hardware space 408 using drivers and receives system error indications from hardware space 408 components. Kernel 406 may implement, in cooperation with hardware space 408 components, a virtual memory system to extend the memory space available to the software stack. Kernel 406 may comprise, for example, a Linux kernel or other Unix variant kernel. Virtual machine 422 and core libraries 420 provide the runtime environment 404 that supports the execution of the one or more user processes. While one virtual machine 404 is illustrated, embodiments of the present disclosure support multiple instances of virtual machine 404, each with its own respective instance of an augmented compiler 424. In other examples, computing system 402 may implement a system virtual machine that provides a virtual architecture over the hardware space 408.

Virtual machine 422 is a virtual execution environment that executes program code for the one or more user processes. Software for the user process(es) executing on virtual machine 422 may comprise machine independent program instructions (e.g., the object code 116) in the form of bytecode or other computer intermediate language generated by an intermediate compiler. Examples of intermediate languages include Dalvik bytecode (available from the Android Open Source Project), Java bytecode (available from Oracle Corporation), and Microsoft.NET Common Intermediate Language (CIL) (available from Microsoft Corporation of Redmond, Wash.). These are just examples. In other examples, the object code 116 is in a higher level language above an intermediate language, without (or with) any intermediate compiler. Examples of the augmented compiler 424 may include a just-in-time (JIT) compiler or an ahead of time (AOT) compiler that compiles program code to native machine code and dispatches the machine code to the processor 410 for native execution.

The augmented compiler 424, whether a JIT compiler or AOT compiler, may begin as an off-the-shelf compiler that is augmented to be able to recognize instructions and information specified in the metaprogram 114, as explained with respect to FIG. 1's example. The augmented compiler 130, upon receipt of a metaprogram 114, becomes customized and optimized for a given hardware and/or software platform(s) based on the information specified within the metaprogram 114. The augmented compiler 424, so customized based on the information in the metaprogram 114, compiles the object code 116 (whether in a higher level language or an intermediate language) into an executable (such as machine code). Further, the metaprogram 114 may include one or more parameters that cause the augmented compiler 424, once it has incorporated metaprogram 114, to compile the object code 116 in a manner optimized particularly for the hardware space 408's hardware configuration.

FIG. 5 illustrates another use case example computing environment for implementing extensible compilation using a composite program 112. FIG. 5 illustrates computing system 502 with respect to a container environment. The computing system 502 includes a software stack with container 504 and image 506, which is executing in an operating environment provided by the hardware space 508. The hardware space 508 includes at least processor 510, memory 512, interface 514, storage 516, and user interface 518. These elements may all be interconnected by one or more system buses. Examples for the processor 510, memory 512, interface 514, storage 516, and user interface 518 are similar to those discussed above with respect to other figures, and are thus not repeated here.

Container 504 may use a level of system level virtualization, such as by packaging up application code and its dependencies (e.g., system tools, system libraries and/or settings, etc.) so that the hosted application can be executed reliably on one or more computing platforms of the computing system 502 (as an example). Container 504 (as an example of one or more containers) may run on the computing system 502 on a host operating system directly, or may be run via another layer of virtualization such as within a virtual machine 522. The container 504 may be scheduled within the infrastructure provided by the hardware space 508 by an orchestrator.

Orchestration may refer to scheduling containers within a predetermined set of available infrastructure, and typically includes determining the required infrastructure based upon the needs of containers being executed/requested for execution. Examples of orchestrators include Kubernetes®, Docker Swarm®, AWS Elastic Container Service™, etc.

The hosted application may be provided from image 506, for example. Further, while the composite program 112 is illustrated as being provided externally to the computing system 502, the composite program 112 may additionally or alternatively be provided via image 506. While illustrated as part of computing platform 502, the image 506 may be provided from another computing platform as well or instead, such as from a cloud resource. Each container 504 that is deployed as part of the computing system 502 may include a separate virtual machine 522 that includes an augmented compiler 524 according to embodiments of the present disclosure. As discussed with respect to FIG. 4, the virtual machine 522 may refer to a virtual execution environment to execute the object code 116 upon compilation by the augmented compiler 524 (and to execute any other program code desired). The object code 116 may be provided as high level language or an intermediate language, as discussed with respect to FIG. 4 as well.

Examples of the augmented compiler 524 include a JIT compiler and an AOT compiler, which incorporates the metaprogram 114 upon receipt of the composite program 112. The augmented compiler 524, so customized based on the information in the metaprogram 114, compiles the object code 116 (whether in a higher level language or an intermediate language) into an executable (such as machine code). Further, the metaprogram 114 may include one or more parameters that cause the augmented compiler 524, once it has incorporated metaprogram 114, to compile the object code 116 in a manner optimized particularly for the hardware space 508's hardware configuration.

Various examples (such as those illustrated with respect to FIGS. 1-5) may occur on standalone machines, as well as in other environments such as in cloud environments. A cloud environment is one in which there is a provider of cloud infrastructure for one or more customers, providing a variety of cloud computing solutions such as infrastructure as a service (IaaS), software as a service (SaaS), and/or platform as a service (PaaS) as some examples. The provider may be a public cloud provider, examples of which include Amazon Web Services™ (AWS™), Microsoft® Azure®, and Google Cloud Platform™, and may be for example a multi-tenant cloud provider that may host a variety of virtualization tools that customers may request to host or otherwise run one or more applications (e.g., as provided and specified by composite program 112). Alternatively (or additionally), the cloud provider may be a private cloud provider, such as an enterprise cloud for a given organization.

With the above examples in mind, some exemplary details of a composite program 112 according to any of the embodiments discussed here are now provided. These exemplary details are by way of illustration only, and are to be used to aid in understanding various principles of embodiments of the present disclosure, with respect to a variety of languages, environments, and situations.

Basic Syntax Examples for Composite Program 112

First, there are some basic syntax and semantics of the language approach used for a composite program 112 that are illustrated. As stated before, A composite program 112 is split into two fragments. The functional fragments is called the object level, illustrated as object code 116 in FIGS. 1-5, while the logic fragment is called the meta level and is illustrated as metaprogram 114. The object level supports lazy, dependently typed, functional programming. The meta level supports typed logic programming. The below examples look first at the object level (e.g., represented by object code 116), and then looks at the meta level (e.g., as represented by metaprogram 114).

Looking at the object level, values are assigned names with def. For example:

def true2: Bool=true

The type annotation can be omitted, in which case the type will be inferred.

def true2=true

Functions are introduced with fun (X)=>BODY. Function types are introduced with

```
Fun (TY1) ->
TY2. Function calls use parenthesis.
def not: Fun (Bool) -> Bool =
fun (b) =>
if b {
false
} else {
true
}
def false2 = not (true)
```

There is also sugar for the above sort of declaration. For example:

```
fun not (b: Bool) -> Bool =
if b {
false
} else {
true
}
```

The language also has let bindings. let bindings can bind any sort of top-level declaration—variants, funs, etc.

```
let {
def true2 = true
} in {
not (true2
)
}
```

Algebraic datatypes are introduced with variant. Type parameters are listed in parenthesis next to the name.

```
variant LinkedList (A)
{
nil
cons (A, LinkedList (A) )
}
```

Pattern matching is introduced with match. The match is exhaustive. Type parameters are applied to generic types with parenthesis, just like function calls.

```
fun not list (list: List (Bool) ) ->
List (Bool) = match list {
nil => nil
cons (b, rest) => cons (not (b), not list (rest) )
}
```

Type variables are introduced with backticks:

```
fun map (f: Fun ( A) -> B, list: List ( A) )
-> List ( B) = match list {
nil => nil
cons (x, rest) => cons (f (x) , map (f, rest) )
}
```

Looking at the meta level, Datatypes are introduced with metavariant. Although syntactically it appears identical to variant, they are desugared to very different constructs.

```
metavariant Nat {
zero
plus one (Nat)
}
```

Predicates are declared with pred. This is in contrast to Prolog, for example, where predicates do not have to be declared. However, allowing this complicates the implementation somewhat, so declaration-before-use is implemented.
pred Add (Nat, Nat, Nat)

Rules are introduced for a predicate with axiom. axioms use:—syntax when the rule has a body.

```
axiom NAdd (zero, 'n, 'n)
axiom
NAdd (plus one ( 'n), 'm, plus one ( j) )
:- NAdd('n, 'm, 'j)
```

Backticked variables are the equivalent of uppercase variables in Prolog. E.g., 'm translates to M, and 'n translates to N. Definitions are introduced with metadef.
metadef one=plus_one (zero)

Variables are introduced that may have solutions assigned to them (metavariables) with metavar. A predicate can then be queried to assign those solutions.

```
metavar n: Nat
query Add (one, one, n)
Solutions:
n = plus one (plus one (zero) )
```

Again, metavars usually do not have to be declared in logic languages, but including it may simplify the implementation.

Backend Implementation Examples

Some practical examples of transformations and optimizations implemented with metaprogramming according to embodiments of the present disclosure are now provided. These examples show off the various features of its metaprogramming that make it uniquely suited for implementing such backend components. Although the focus is not on the object level, a few samples of object-level programs are shown as well.

First, these examples rely upon familiarity with λProlog and let insertion, and basic familiarity with staging constructs (Code, quoting and splicing). Second, the implementations of these transformations will not necessarily be the most efficient or effective. Their primary purpose is to introduce the approach used for a composite program 112 example.

Constant Folding

Constant folding is an optimization that executes small, terminating computations at compile time. For instance, constant folding would take the following program:
 def foo=add (2, 3)
 def bar=mul (foo, 6)
and transform it into
 def foo=5
 def bar=30

This may be implemented as a metaprogram (e.g., a metaprogram 114), starting by declaring a predicate.
 pred ConstantFold (Code ('A), Code ('A))
Code (A) is the type of object programs with type A that have been quoted. Quoting refers to the same concept in languages like Scheme and Clojure—it takes object-level code and turns it into data that metaprograms can manipulate. Likewise, splicing takes this data and turns it back into an object-level program. Quoting is written <e> and splicing is written ~e, where e is an expression.

```
axiom
ConstantFold ( 'head< ( fun (x) => ~'body (<>> ) (~ 'arg) >,
'body ( arg) )
: - Terminating ( 'head, 'arg)
axiom
ConstantFold ( <~ 'head (~ 'arg) >, 'e)
: - ConstantFold ( head, 'head2)
, ConstantFold ( <~ 'head2 (~ 'arg) >, 'e)
pred Terminating (Code ( A), Code ( B) )
/* Rules not shown, refer to below */
```

These are the central two rules in this example implementation of constant folding. They perform compile-time reduction on function application. The first rule attempts to evaluate the application head such that it is a function. It then extracts the body of this function into body and substitutes the argument. If that rule fails, the second rule will attempt to constant fold the application head and the constant fold the new application. It is worth noting that this predicate does not automatically handle termination, thus termination may be manually checked with the Terminating predicate.

The rest of the rules simply apply the predicate to the subterms of compound terms (if expressions, let bindings, etc.), so they are not discussed further herein. The predicate is simple, but can constant fold any function application.

Monomorphization

Monomorphization is an optimization that specializes generic functions to certain types. This exposes more concrete type information to the backend, which aids additional optimizations. Monomorphization will work as follows. The object program will be traversed. At every let binding a letlocus will be inserted. letlocuss serve as points for let insertion. The binding's name will then be added to a mapping from locuses to variables.

```
pred Bound (Code ( 'A) , Locus)
pred Monomorphize (Code ( A) , Code ( A) )
axiom Monomorphize (
<letdef 'e 'x in ~ 'body>
letlocus 'loc in 'body2)
: - Bound ( 'x, 'loc) => Monomorphize ( 'body, 'body2)
```

The P=>Q operator is implication. It adds P to a local stack of facts and then queries Q.

When a function application is encountered, first check if the application head is a let bound variable. If it is, the locus mapped to that variable is retrieved and the process proceeds. This application will then be checked to determine if it is terminating. In dependently typed languages, monomorphization is actually partial evaluation of type applications. This is compile time evaluation—to make sure the function will terminate when applied.

If the application is terminating, then the analysis proceeds. There is a mapping in scope from applications to variables assigned to monomorphized definitions. If the application is present in this mapping, the let-bound variable containing the monomorphized definition is retrieved and returned, in which case the process is done. If it is not present, the monomorphization is performed. Generating the definition involves some circular thinking: add the monomorphized definition to the mapping and then monomorphize the definition. If this is not done, monomorphization would loop on recursive functions.

To accomplish this, the let binding containing the monomorphism is assigned to a metavariable. This binding will then be added to the mapping and the definition monomorphized. When the same application is encountered inside the recursive definition, the predicate will return find the application in the mapping and return the let bound variable. The monomorphized definition will be assigned to the metavariable once the predicate completes. Monomorphization will have generated a recursive binding.

This rule also uses the committed choice operator (P|Q). This way it only choses one of the two options (using an earlier monomorphization or generating a new one) instead of nondeterministically choosing both.

```
pred Defined(Code('A), Code('B), Code('C))
axiom
  Monomorphize (<~'head@(fun(x) => ~'body(<x>))(~'arg)>, 'e)
  :- Bound('head, 'loc)
  , Terminating('head, 'arg)
    , ( Defined('head, 'arg, 'e)
       | Defined('head, 'arg,
       'def) => ( GenLet('loc,
         'monoed, 'def)
       , Monomorphize('body('arg), 'monoed)
       )
    )
```

Finally, monomorphizations on multi-argument functions is handled. The predicate will monomorphize the application head. If this succeeds, is will return a let-bound variable, which can be applied to the argument. This application will then itself be monomorphized.

```
axiom
Monomorphize ( <~ 'head (~'arg) >, 'e)
: - Monomorphize ( head, 'head2)
, Monomorphize ( <~ 'head2 (~ 'arg) >, 'e)
```

As with constant folding, this predicate involves some additional rules that simply traverse non-application terms and apply the predicate to their constituents. The rules all follow this form, so the rest will be omitted.

```
axiom
    Monomorphize(
        <if ~cond {
            ~true_body
        } else {
            ~false_bod
            y
        }>,
        <if ~cond2 {
            ~true_body2
        } else {
            ~false_body
            2
        }>)
    :- Monomorphize(cond, cond2)
    , Monomorphize(true_body, true_body2)
    , Monomorphize(false_body, false_body2)
```

Results of Monomorphization

The predicate is now used. Recall that backticked variables are transformed into implicit parameters. E.g., map's signature Fun (Fun ('A)→'B, List ('A))→List ('B) is equivalent to Fun (inf A: Type, inf B: Type, Fun('A)→'B, List ('A))→ List (B).

```
fun not (b: Bool) -> Bool =
if b {
false
} else {
true
}
fun map (fn: Fun ( A ) -> 'B, list: List ( A ) )
-> List ( 'B) = match list {
nil => nil
cons (x, rest) => cons (fn (x), map (fn, rest) )
}
metavar mono term
query Monomorphize (map (not, cons (true, cons (false, nil) ) ) ,
mono term)
```

The above query results in the following program:

```
fun     not (b:     Bool)        -> Bool =
if      b {
false
} else {
true
}
fun map (fn: Fun ( 'A) -> 'B, list: List ( A ) )
-> List ( B) = match list {
nil => nil
cons (x, rest) => cons (fn (x), map (fn, rest) )
}
fun gen6948 (list: List (Bool) ) ->
List (Bool) = match list {
nil => nil
cons (x, rest) => cons (not (x), gen6948 (rest) )
}
Solutions:
mono term = gen6948 (cons (true, cons (false, nil) ) )
```

This may not be as expected. The query has not only monomorphized map, it has specialized map to not. Recall that in dependently typed languages, monomorphization is actually partial evaluation of type applications. In dependently typed languages, type applications and term applications are not distinguished syntactically. A specializer has been created rather than a monomorphizer.

List Fusion

Fusion is an optimization that removes intermediate data structures. For example, (map f map g) list is semantically equivalent to map (f g) list, but the former performs two traversals and one extra list. The latter performs one traverse and does not produce an extra list.

The fusion system implemented here in this example is called foldr/build fusion. The idea behind it is to have a small set of core functions that all others are defined in terms of. Fusion is then defined for this core set, and get fusion for the derived functions for free. It is simple to implement according to embodiments of the present disclosure for a composite program while simultaneously being very beneficial for idiomatic functional programs. foldr and build are first defined.

```
variant List (A) {
cons (A, List (A) ) ,
nil
}
fun foldr (f: Fun ( A, B) -> 'B, init: 'B, list:
List ( A ) ) -> 'B = match list {
nil => init
cons (x, rest) => f (x, foldr (f, init, rest) )
}
fun build (g: Fun ( 'A, 'B) -> 'B) -> 'B =
g (cons, nil)
```

The optimizer itself is then defined. This rule implements the fusion rule foldr (f, z, build (g))=g f z.

```
pred Fuse (Code ( A) , Code ( A) )
axiom Fuse (<foldr(~'f, ~'init, build(~'g))>, <~ 'g(~'f,
~'init) > )
```

The rest of the rules simply traverses compound terms and applies the predicate to their subterms, like in the previous example.

Composite Programs in Detail

In the previous section the composite program's features were discussed informally for the sake of explanation. Now the major aspects of embodiments of the present disclosure regarding composite programs are discussed in more detail.

Two-Level Type Theory: Splitting

The design of the composite programming may be centered around two-level type theory (2LTT). In 2LTT, the language is split into two levels, or fragments of the language. This is realized using two types of types (universes): Type for object-level types and MetaType for meta-level types. For instance, recalling some types from the previous section, there is Bool:Type and Locus:MetaType.

A key aspect of 2LTT is that all types stay on their own level. For instance, types Fun (Locus)→Locus and MetaFun (Bool)→Bool are invalid because Fun is object-level while Locus is meta-level, and Meta Fun is meta-level while Bool is object-level. Meta-level and object-level values cannot intermingle. The separation of the levels is done purely using types, as opposed to ad-hoc syntactic restrictions or other such methods. Declarations are also separated in this manner:

def NAME: TY=VAL requires that TY:Type
    metadef NAME: TY=VAL requires that TY:MetaType
    axiom TY requires that TY:MetaType
    metavar NAME: TY requires that TY:MetaType Movement Between Levels Several operations enable the levels to interact:
    Lifting, or Code (A). Given A:Type, there is Code (A): MetaType. Code (A) is the type of quoted object-level code.

Quoting, or <v>. Given v:A and A:Type, there is <v>: Code (A). Quoted code is meta-level data representing an object-level program.

Splicing, or ~x. Given x:Code (A), there is ~x:A. Splicing takes quoted code and inserts it back into an object-level program.

Note that none of these constructs can be given function types because they take values from one level to another. Say it was attempted to type lifting as:

Code: MetaFun (Type)→MetaType

This is invalid because a meta-level type (Meta Fun) contains an object-level type (Type).

Significance

With these simple rules, 2LTT provides a clean type-based way to stratify languages. There are essentially two languages that still look and feel like one language. This provides a large amount of design flexibility: two languages can cater to entirely different domains, with different sorts of types and features on each level.

According to embodiments of the present disclosure, the object level (e.g., the level at which object code 116 is provided) is designed for general purpose programming while the meta level (e.g., the level at which metaprogram 114 is provided) is designed specifically for metaprogramming. For purposes of discussion herein, reference to object language will be made interchangeably with object level, and similarly with respect to meta language and meta level.

Meta Level

The object language is one half of the composite program/program language, the other half being the meta language. Logic programming with hereditary Harrop formulas, pattern unification, and higher-order abstract syntax (HOAS) is especially effective for expressing program transformations, which are what a compiler backend is composed of.

The present disclosure's approach with logic programming allows program transformations to be declarative—the language handles many aspects of these transformations automatically. Basic logic programming handles two of these: (1) object program equivalences and (2) the phase-ordering problem.

(1) Logic programs execute via unification, which tries to find where terms are equal. In the language used with the augmented compilers of the present disclosure, this includes applying object-level computation rules. Assuming an Int type and integers with the relevant computation rules will result in the following definitions:

```
pred OptimizeInt (Code (Int), Code (Int) )
axiom OptimizeInt (< ( 'x * 'y) / 'y>, 'x)
def foo: Int = 3 * 2
```

Querying this predicate with the following will still deduce that x=<3>:

```
metavar x: Code (Int)
query Optimize (<foo / 2>, x)
Solutions:
X = < 3>
``` foo*2 is not syntactically equivalent to ('x*'y)/'y, so this computed by the search automatically evaluating foo when attempting to unify foo/2 with ('x*'y)/'y—it automatically reduced foo/2 to (3*2)/2, which then easily produced the results 'x=<3>. This scales to larger cases such as inlining entire functions.

Unification will apply the regular computation rules of the object language when performing search. These computation rules will change depending on the features of the object language. For instance, in an impure language evaluating foo would not be valid, since foo may cause side effects.

The language approach according to embodiments of the present disclosure also automatically handles simpler syntactic equivalences. For instance, 2+2 is considered equivalent to (+) 2 2. Unification does not operate on raw syntax. Rather, it operates on a core language, which all terms are translated to. This translation eliminates simple syntactic differences between programs, which is a common source of frustration in other metaprogramming frameworks. In the core language, 2+2 and (+) 2 2 are represented exactly the same.

(2) A classic problem is that applying some optimizations may block other, more beneficial optimizations. For instance, inlining may eliminate a function call, but may block common subexpression elimination (CSE). Nondeterminism presents a solution to this by simply producing all possible results of an optimizers—all optimizations can be applied in every order, the results collected, and then a cost predicate applied to find the best result. For example:

```
pred Optimize (Code ( A) , Code ( A) )
axiom Optimize ( 'x, 'y) :- CommonSubexprElim ( 'x, 'y)
axiom Optimize ( 'x, y) : - Inline ( 'x, 'y)
.
metavar optimized prog
query Optimize (prog, optimized prog)
```

This query will produce multiple solutions for optimized prog, among them some where inlining was performed and some where CSE was performed. This is as opposed to only one—possibly suboptimal—path being taken.

Pattern Unification

Basic logic programming automatically handles two aspects of program transformations, but there is a third which it cannot: variable binding. It is desirable to handle variable binding declaratively: without having to reimplement substitution. The language approach according to embodiments of the present disclosure accounts for this by extending basic logic programming with pattern unification. Consider this predicate which inlines a function call:

pred Inline (Code ('A), Code ('A))
axiom Inline (<(fun (x)=>~('f (<x>))) (~'arg)>, 'f ('arg))

The key term is the ~('f (<x>)). This sort of term is dealt with as a special case by pattern unification. When unifying ~('f (<x>)) with a function's body, it solves 'f as follows:

1. Check that 'f is applied to a series of distinct quoted or non-quoted variables
2. Check that the body only contains these applied variables
3. Wrap the body in a metalam for each of these variables.
4. Wrap each bound variable in the body in a splice
5. Wrap the whole body in a quote For instance, querying

```
def not: Fun (Bool) -> Bool =
fun (x) =>
if x {
false
} else {
true
```

```
}
metavar inlined not: Code (Bool)
query Inline (<not (true) >, inlined not)
```

Would produce this solution for 'f while executing (for clarity, the type of 'f is also written):

```
Solutions:
    'f: MetaFun(Code(Bool)) -> Code(Bool)
    =
    metafun(x) =>
        <if ~x {
            false
        } else {
            true
        }>
```

Thus, the second argument of the Inline rule—'f ('arg)—substitutes 'arg inside the body to get

```
<if ~< true> {
false
} else {
true
}>
```

Splices and quotes in this result cancel out, resulting in a final, inlined function:

```
Solutions:
inlined not =
<if true {
false
} else {
true
} >
```

In short, pattern unification allows extraction of the bodies of binders to metafunctions which perform substitution.

Hereditary Harrop Formulas

Another traditionally difficult aspect of program transformations is the handling of fresh variable generation. For instance, if one were writing a predicate that replaces occurrences of a function's variable with true, this would assume:

```
pred Replace (Code ( 'A) , Code ( A) )
axiom
Replace (<fun (x) => 'body>, <fun (x) => 'body2)
: - Replace ( body, body2)
axiom
Replace ( 'x, <true>)
:- ? ? ?
```

The question arises as to how one would track what variables were bound, for the desired ability to generate own variables and substitute them inside the body, which can then be tracked using a list. Variables cannot be generated using a side effect because the meta language is pure. VarState contains a source of fresh variables, which is incremented every time a new one is generated. For example:

```
pred Replace(Vars, VarState, VarState, Code('A), Code('A))
axiom
    Replace(
        'vars,
        'varstate1,
        'varstate3,
        <fun(x) => ~'body(<x>)>,
        <fun(x) => ~'body2(<x>))
    :- FreshVar('varstate1, 'varstate2, 'var)
    , Replace(
        insert('var, 'vars),
        'varstate2,
        'varstate3,
        'body('var),
        'body2('var))
axiom
    Replace('vars, 'varstate, 'varstate, 'x, <true>)
    :- Contains('vars, 'x)
```

This expression is unappealing, however. One must first manually pass the new VarState around to every predicate that uses it, with several variables that exist only to pass state around. This state passing approach is error-prone for that reason. Furthermore, statically typing this program is complicated. Preferred would instead be a declarative approach to variable generation, one rooted in a logic, which embodiments of the present disclosure provide. There is an extension to Horn clauses which does exactly this: Hereditary Harrop formulas.

```
pred IsBound (Code ( 'A) )
pred Replace (Code ( 'A) , Code ( 'A) )
axiom
    Replace (<fun (x) => ~'body (<x>) >, <fun (x) =>
    ~ 'body2 (<x>) > : - forall (x) -> IsBound (x) =>
    Replace ('body (x), 'body2 (x) )
axiom
    Replace ( 'x, <true>)
    : - IsBound ( 'x)
```

The two extensions are universal quantifiers in predicate bodies (forall) and implication=>. And, note that the implication syntax and function syntax both use=>, and should not be confused with each other.

How do these new constructs execute? forall (x)=>P can be understood as generating a fresh variable which can be used in P. P=>Q can be understood as adding P to the list of facts in scope locally when querying Q. This list grows and shrinks like a stack. Observe the trace of a query:

metavar tm
    query Replace (<fun (x)=>x>, tm)

Proving the first rule:

```
Stack:
Goal: Replace (<fun (x) => ~'body (<x>) >, <fun (x) =>
~ 'body2 (<x>)>)
    'body = metafun (x) => <~x >
    tm = < fun (x) => ~'body2 (<x>) >
```

This succeeds, so attention moves on to the body of the predicate:

Stack:
    Goal: forall (x)→IsBound (x)=> Replace ('body (x), 'body2(x))

This is attempting to prove a forall. A fresh variable is generated and bound to x. This discussion will call this variable #0. Moving on to the body of the forall:

Stack:
Goal: IsBound (#0)=> Replace ('body (#0), 'body2 (#0))
Now an implication is to be proven. This will add its left hand side to the stack of facts and attempt to prove the right hand side:
Stack: IsBound (#0)
Goal: Replace ('body (#0), 'body2 (#0))
This goal matches the second rule, so attention moves to attempt to prove its body:
Stack: IsBound (#0)
Goal: IsBound (<~#0>)
Quotes an splices cancel out, so this rule matches, and the analysis is done. The predicate has solved tm=<fun (x)=>~<true>>. The extension of Horn clauses to hereditary Harrop formulas provides the tools to handle variable generation and binding declaratively. Plumbing of fresh variable state and keeping track of scope is unnecessary.

Pruning Undesired Solutions

As discussed above, nondeterminism allows for the production of all possible results of a combination of optimizations, thus obviating the phase-ordering problem. However, eventually this list of solutions has to be cut down to a single, best result. The language approach of the present disclosure allows the solutions of a metavar to be iterated and pruned. For instance, assume the following query:

```
pred Foo (Code (Bool) )
axiom Foo (<true>)
axiom Foo (<false>)
metavar b: Code (Bool)
query Foo (b)
Solutions:
  b = < true>
  b = < false>
```

This query has produced multiple solutions for b. The query may be amended to prune all the solutions which are not equal to <true>:

```
query
  with Foo (b)
  for b as x {
    Equal (b, <true>)
  }
Solutions:
  b = < true>
```

The with P for V as X in {Q} executes with the following steps:
1. Query P
2. Gather all the solutions for V. Iterate over the solutions, where each one will be assigned to the variable X
3. Query Q. If Q fails, prune that solution for V. If it succeeded, keep that solution.

When there is no P predicate to be queried, the with P part may be omitted.

Returning to optimization, the following query optimizes some program ma in, then prunes the results to find the best. The cost of a program is summarized as a Nat and determined by the Cost predicate. CostsLess determines if the first program costs less than the second program:

```
pred Cost (Code (Int) , Nat)
/* 'Cost' will remain abstract */
pred Less (Nat, Nat)
/* 'Less' will remain abstract */
```

```
pred CostsLess (Code (Int) , Code (Int) )
axiom
  CostsLess ( 'prog1, 'prog2)
  : - Cost ( 'prog1, 'cost1)
' Cost ( 'prog2, 'cost2)
' Less ( 'cost1, 'cost2)
metavar optimized_main: Code (Int)
query
  with Optimize (main, optimized_main)
  for optimized main as prog1{
for optimized main as prog2{
    CostsLess (prog1, prog2)
  }
{
```

This query will loop over all possible results prune all except the one which costs the least.

let Insertion

As demonstrated above, it is useful to be able to generate let bindings nonlocally. let insertion in the composite language approach according to embodiments of the present disclosure works via two constructs: letlocus LOC in BODY, and the GenLet predicate. letlocus marks a point where let bindings may be inserted, and GenLet inserts a let binding at a given locus with a given definition, returning the let-bound variable. GenLet also uses memoization: If a let bound definition is already present in a locus, GenLet will return that let-bound variable instead of generating a new definition. For instance, the following query:

```
pred Foo (Code ( 'A) , Code ( 'A) )
axiom
  Foo (
    letlocus 'loc in '_,
    letlocus 'loc in <struct { a = ~ 'var1, b = ~ 'var2 } > )
  : - GenLet ( 'loc, <true>, 'var1)
  , GenLet ( 'loc, <true>, 'var2)
metavar term
query Foo (letlocus 'loc in ' , term)
``` will produce this solution:

```
Solutions :
  term =
    let (
      def gen6246 = true
    } in{
      struct { a = gen6246, b = gen6246}
    }
```

Instead of the solution:

```
Solutions:
  term =
    let{
      def gen6246 = true
      def gen7273 = true
    }in{
      struct { a = gen6246, b = gen7273}
    }
```

The last solution listed above is without memorization: an additional binding was generated even though they bind identical terms. This is especially useful in cases like monomorphization where it is desirable to avoid code size explosion.

letlocus is not strictly needed. Where to place let bindings could be inferred based on the variables present in the definition being bound, but complicates the implementation. Inferring placements also makes memoization less reliable.

Algebraic Datatypes

Desugaring for the meta level's Algebraic Datatypes (ADTs) is simpler than the object level's ADT. The type constructor and data constructors are each translated to an axiom. For instance, the following program:

```
metavariant List (A) {
  nil
  cons (A, List (A) )
}
```
is lowered to:
```
axiom List: MetaFun (MetaType) -> MetaType
axiom nil: List ('A)
axiom cons: MetaFun ('A, List ('A) ) -> List ('A)
```

Adding New Primitives

New primitives can also be added to the object language as axioms. For instance, primitive integers could be added as:
  axiom IntC: Code (Type)
  axiom oneC: Code (~Int)
  axiom zeroC: Code (~Int)
  axiom addC: Code (Fun (~Int, ~Int)→~Int)
  axiom multiplyC: Code (Fun (~Int, ~Int)→~Int)
Spliced versions can then be defined for convenience:
  def Int=~IntC
  def one=~oneC
  def zero=~zeroC
  def add=~addC
  def multiply=~multiplyC
The backend can then be extended with rules to compile these new primitives.

Object Level

The object language supports lazy, pure (except for non-termination), dependently typed, functional programming. Functions are defined by recursion and pattern matching. Dependent records are an atypical feature of the object language. It is important to note that there is no hard, formal reason why this design of the object level was chosen. The present disclosure's two-level design with logic programming on top would work with any sort of language, for instance a low-level imperative language. A functional object level is exemplary. Accordingly, the following discussion is not central to the language's thesis.

Type System

The object level's type system composed of only three new primitives (although new primitives can be added using the metaprogram language): dependent function types (Fun (x: A)→B), dependent record types (Struct {a: A, b: B}), and a Bool type. The object language is structurally typed, all complex types are composed of these three primitives.

Function types are standard, and arguments may be marked inf for implicit. For instance, the identity function may be written and called as:
  def id: Fun (inf A:Type, A)→A=fun (x)=>x
  def example=id (true)

Dependent record types are introduced with Struct, the records themselves introduced with struct, and field selection uses a dot (.). The following is a trivial example to demonstrate the syntax:
  def Ty: Type=Struct {A: Type, x: A}
  def val: Ty=struct {A=Bool, x=true}
  def Bool2: Type=val. A
  def true2: Bool=val.x Dependent records are interesting, as they can be used to implement algebraic datatypes and ML-style modules. These will be covered in the following sections.

Purity

The object language is pure—it does not implicitly allow side effects. This does have a significant effect on the language as a whole, in that it increases the number of program equivalences that can be automatically deduced. As covered above, the language will automatically apply object-level computation rules in an attempt to equate programs. If the object level were impure, d-equivalence (reduction of lets substituted in their bodies) and b-equivalence (reduction of function application) would not be trivially valid. In both cases side effects may be duplicated or discard, in the latter case due to lazy evaluation.

Algebraic Datatypes

Dependent records can be used to implement ADTs as typesafe tagged unions. The tag field determines the variant, and the data field carries the payload of the union:

```
def Unit: Type = Struct {{
def unit: Unit = struct {}
def Nat: Type =
  Struct{
    tag: Bool,
    data:
      if tag{
        Unit
      } else {
        Nat
      }
  }
def zero: Nat =
  struct {
    tag = true,
    data = unit
  }
def plus_one: Fun(Nat) -> Nat =
  fun(nat) => struct {
    tag = false,
    data = nat
  }
```

In fact, the ADT syntax discussed previously is just syntactic sugar for the above sort of declarations. The sample below is directly translated to the sample above.

```
variant Nat{
  zero
  plus_one (Nat)
}
```

Because the object level is structurally typed, any variant declarations with the same shape will be considered equal—they are translated to the same Struct type.

Finally, match syntax is directly translated to use of if and field selection. Continuing with the Nat example, the following sample:

```
match plus one (zero){
  zero => foo
  plus_one (n) => bar (n)
}
``` is translated to the following. let-bind val in order to avoid duplicating it in the branches.

```
let {
  def val = plus_one (zero)
} in{
  if val.tag
    { foo
  } else{
    bar (val . dat
    a )
  }
}
```

ML-Style Modules

Dependent records also allow expression of ML-style modules: Signatures are record types, structures are records, and functors are ordinary functions. For instance, here are modules for ordering and sets:

```
variant Ordering{
  lt
  eq
  gt
}
def ORD: Type = Struct {
  T: Type,
  compare: Fun (T, T) -> Ordering
}
``` showing examples and the motivation for this:

```
def BoolOrd: ORD = struct{
  T = Bool,
  compare = fun (b1, b2) =>
    if b1{
      if b2{
        eq /* true == true */
      } else{
        gt /* true > false */
      }
    } else { if
      b2{
        lt /* false <
        true */ } else{
        eq /* false == false */
      }
    }
}
def SET: Type = Struct{
  ElemT: Type,
  SetT: Fun (Type) -> Type,
  empty: SetT (ElemT) ,
  insert: Fun (SetT (ElemT), ElemT) -> SetT (ElemT) ,
  remove: Fun (SetT (ElemT), ElemT) -> SetT (ElemT) ,
  member: Fun (SetT (ElemT) , ElemT) -> Bool
}
variant List (A: Type){
  nil
  cons (A, List (A) )
}
def ListSet: Fun (ORD) -> SET =
  fun (ord) => struct{
    ElemT = ord. T,
    SetT = List,
    empty = nil,
    . . . /* Other fields omitted for space */
  }
```

Additionally, signatures can be modified through record patching, which functions similarly to Standard ML (SML) 's where type and Rust's TRAIT<Item=T>. For instance, the SET signature can be modified to only hold Bool values with patch SET {ElemT=Bool}. The typechecker translates this to use of singleton types, types that only hold a single value. Thus, the typechecker can simply look at the signature of a patched module to determine the values of the patched fields.

Lazy Evaluation

The object language also uses lazy evaluation. This is the reason why recursive types do not cause the typechecker to loop—the recursive occurrences are only evaluated when demanded by unification. This works for a large number of recursive types, but it is worth noting that some instances still cause loops.

def Foo: Type=Bar
def Bar: Type=Foo
def foo: Foo=bar
def bar: Bar=foo

Typechecking foo and bar causes nontermination.

The example language used for embodiments of the present disclosure for a composite program 112 is designed to reconcile high-performance and high-level programming. The language uses logic programming in a novel way to facilitate user-defined program transformations. In general, this facilitates the use of programming languages with user-extensible compilation. There are several axes upon which the design of such languages can move, including:

Infinite levels. Using a programming language system with two dissimilar levels allows the meta-language and object language to be designed separately. An alternative system could use infinite identical levels. Although this system would lose the above property, it would allow for meta-meta-level compilers: A compiler for object-level programs could be written. This compiler could then compile itself, since the meta language and object language would be identical.

Alternative object languages. In the above example, the object language is dependently typed and functional. However, this is not an inherent requirement of the two-level design. The choice of object level affects what object-level equalities the system can automatically use. For instance, b equality and d equality would not be trivially valid with an impure object language.

Figure 6:
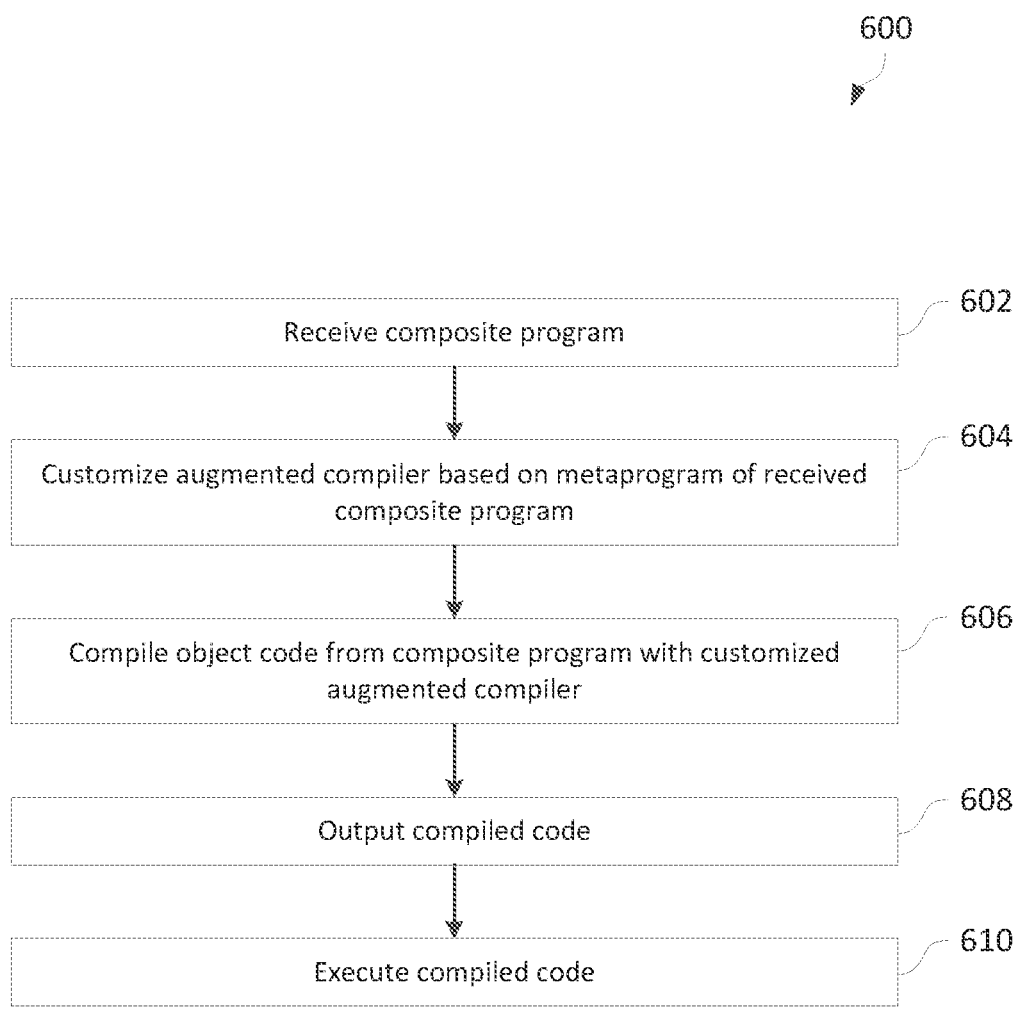
FIG. 6 illustrates a method for implementing a composite program according to some embodiments of the present disclosure.

Turning to FIG. 6, a flow diagram of a method 600 for implementing a composite program 112 according to some embodiments of the present disclosure is illustrated. In the description of FIG. 6, reference is made to elements of FIGS. 1-5 for simplicity of illustration. In an embodiment, the method 600 may be implemented by an exemplary computing system 118. It is understood that additional steps can be provided before, during, and after the steps of the method 600, and that some of the steps described can be replaced or eliminated for other embodiments of the method 600.

At block 602, the computing system 118 receives a composite program 112 (e.g., including a metaprogram 114 and object code 116). In some examples, this is from a developer system 102, such as illustrated in FIG. 1. In other examples, the computing system 118 and the developer system 102 are the same (i.e., the developer is using the system where the composite program 112 is being compiled), in which case receipt of the composite program 112 may be from storage 124 or another portion of memory 126, to name a few examples. For example, receipt of the composite program 112 may be by the augmented compiler 130 according to embodiments of the present disclosure.

At block 604, the computing system 118 customizes the augmented compiler 130 based on the one or more parameters specified in the metaprogram 114 of the composite program 112. For example, the augmented compiler 130, which has been augmented to recognize the metaprogram 114, incorporates the metaprogram 114 into the compiler 130 which optimizes the compiler in the manner specified/desired from the metaprogram 114.

At block 606, the augmented compiler 130 of the computing system 118, which has been customized according to the metaprogram 114 at block 604, compiles the object code 116 from the composite program 112 with the optimizations/capabilities implemented per the metaprogram 114. In some examples, the object code 116 was a high-level language (e.g., higher level than intermediate), while in other examples object code 116 was an intermediate language already compiled by an intermediate compiler (e.g., still at a higher level than machine code), to name just a few examples.

At block 608, the augmented compiler 130 outputs the compiled code—e.g., as compiled code 202 as illustrated in FIGS. 2-3. For example, the compiled code is output as machine code (an executable). In particular, based on the customizations from block 604 according to the metaprogram 114, the compiled code is optimized for as specified by the programmer, such as to take advantage of specific hardware optimizations and so forth.

At block 610, the computing system 118 executes the optimized, compiled code that was output at block 608. Thus, the compiled code may be executed by a system where the metaprogram 114 customized the compiler to take advantage of any specific attributes and strengths of the hardware on which the compiled code is executed. In other examples, the compiled code may be stored before execution, and provided to another system for execution, such as other systems that share some or all of the hardware properties for which the metaprogram 114 customized the augmented compiler 130.

Figure 7:
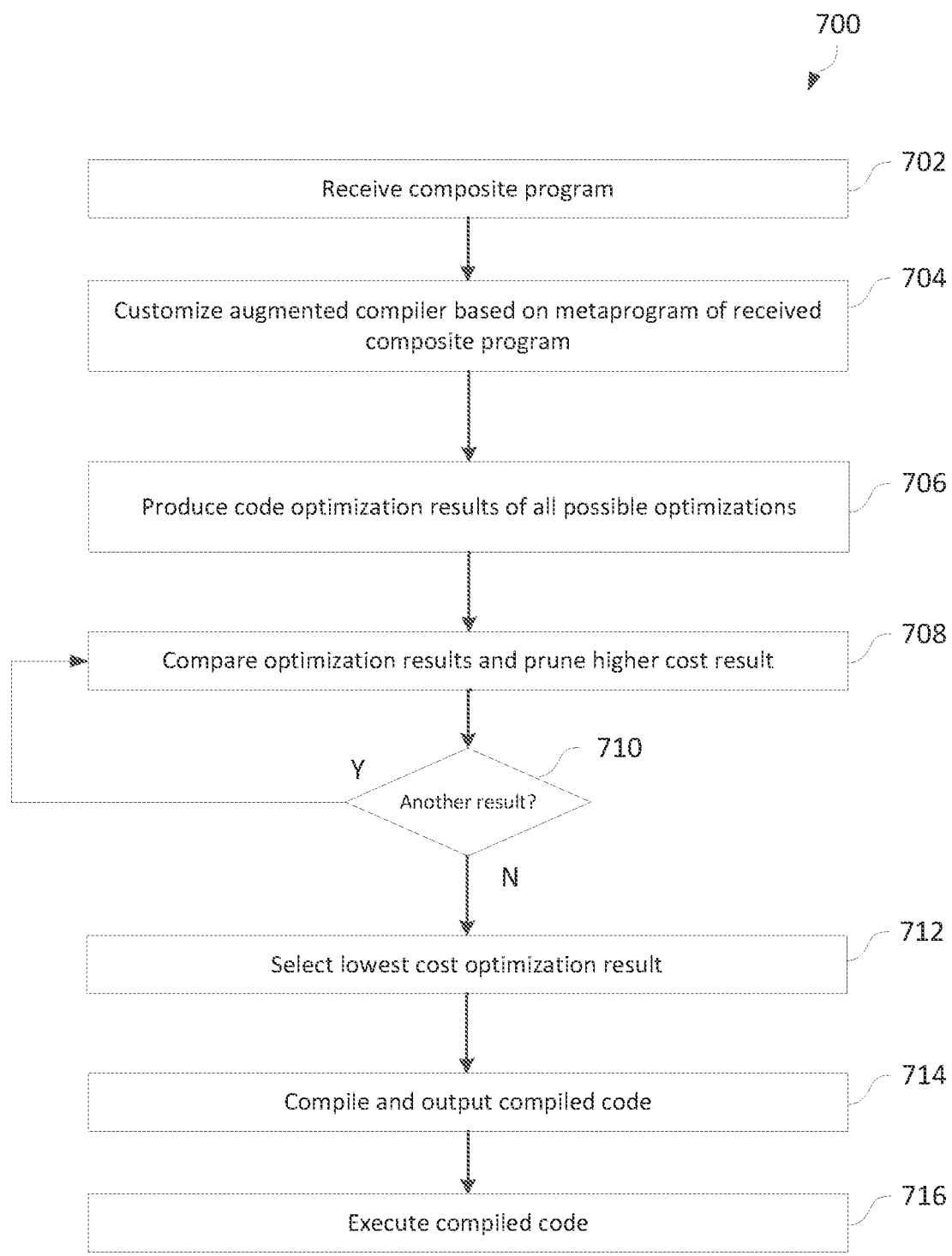
FIG. 7 illustrates a method for implementing a composite program using nondeterminism for all optimization options according to some embodiments of the present disclosure.

FIG. 7 illustrates a method 700 for implementing a composite program using nondeterminism for all optimization options. In the description of FIG. 7, reference is made to elements of FIGS. 1-5 for simplicity of illustration. In an embodiment, the method 700 may be implemented by an exemplary computing system 118. It is understood that additional steps can be provided before, during, and after the steps of the method 700, and that some of the steps described can be replaced or eliminated for other embodiments of the method 700.

At block 702, the computing system 118 receives a composite program 112 such as discussed above with respect to block 602.

At block 704, the computing system 118 customizes the augmented compiler 130 based on the one or more parameters specified in the metaprogram 114 of the composite program 112, such as discussed above with respect to block 604.

At block 706, the augmented compiler 130 of the computing system 118, which has been customized according to the metaprogram 114 at block 604, produces all possible results of a combination of optimizations, thus obviating the phase-ordering problem. This has also been referred to as a design of experiment approach—instead of keeping all parameters but one the same and comparing the results with another test where just one parameter is changed, this approach rapidly moves all at the same time in order to assess the results to look at what combination of parameters will be best.

At block 708, the augmented compiler 130 iterates through the optimization results in order to prune the results to a single, best result. For example, the augmented compiler 130 may compare results with each other (such as two results) and prune the result with higher cost to the system. Cost here may refer to a variety of elements, such as the cost in terms of processing resources, memory resources, and/or time to name a few examples.

At decision block 710, the augmented compiler 130 determines if there are any more optimization results to iterate over. If there are more results, then the method 700 returns to block 708 to compare the next result with the unpruned result from the prior iteration. The method 700 then proceeds as laid out above and further below. If, instead, at decision block 710 it is determined that there are no more optimization results to iterate over, then the method 700 proceeds to block 712.

At block 712, the augmented compiler 130 selects the least cost optimization result based on the iterations over the results from blocks 708 and 710. The result of this process is the looping over all possible results to prune all results except for the one optimization which costs the least to the system for the one or more parameters of interest to the developer. This could include, for example, size of program (e.g., to fit in memory better), complexity of program (e.g., to reduce processing burden on system where the program executes), and/or any other parameters of interest. In some examples, the optimization parameter of interest may be pre-selected (e.g., pre-stored) by the compiler 130. In other examples, the developer of a composite program 112 using the compiler 130 may select what parameter(s) is of most interest to select as lowest cost. This may be specified, for example, via metaprogram 114.

At block 714, the augmented compiler 130 compiles the object code 116 from the composite program 112 with the optimizations/capabilities implemented per the metaprogram 114 and selected at block 712. In some examples, the object code 116 was a high-level language (e.g., higher level than intermediate), while in other examples object code 116 was an intermediate language already compiled by an intermediate compiler (e.g., still at a higher level than machine code), to name just a few examples. The augmented compiler 130 outputs the compiled code—e.g., as compiled code 202 as illustrated in FIGS. 2-3.

At block 716, the computing system 118 executes the optimized, compiled code that was output at block 714, such as discussed above with respect to block 610 of FIG. 6.

Figure 8:
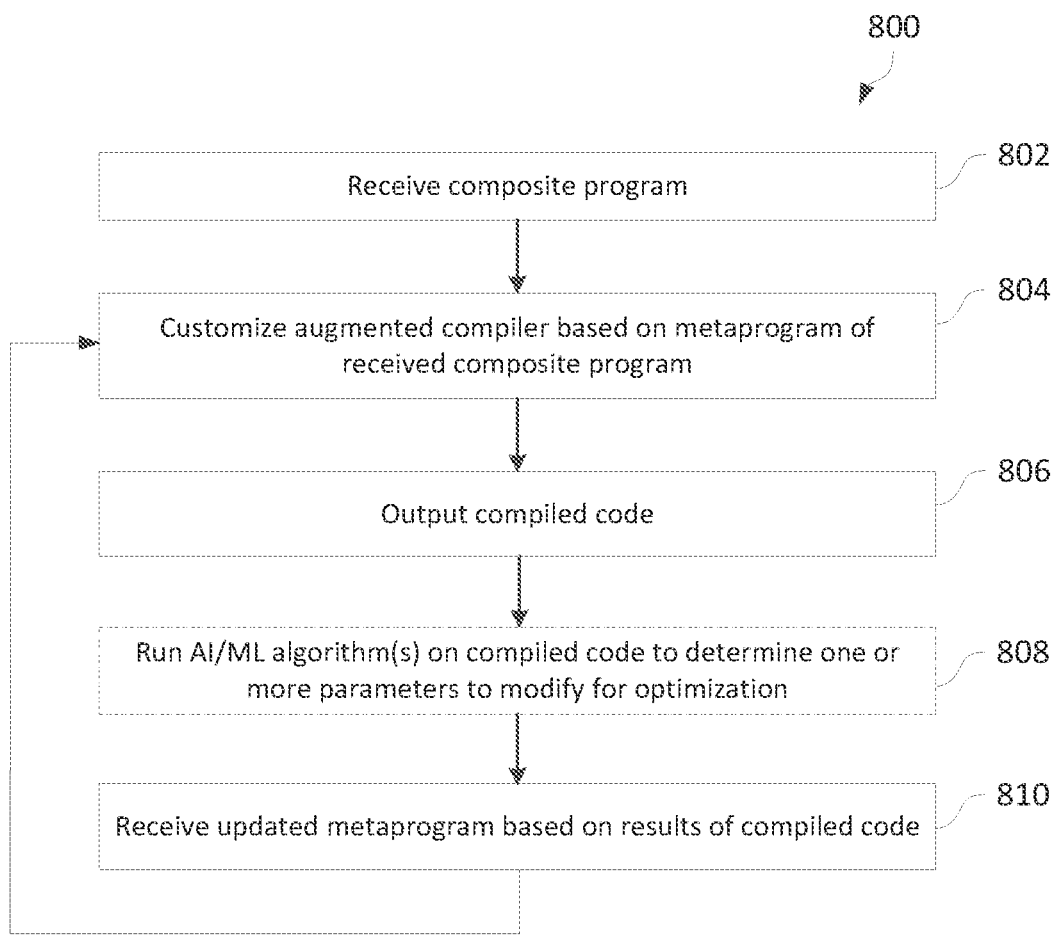
FIG. 8 illustrates a method for implementing a composite program with modification according to some embodiments of the present description.

FIG. 8 illustrates a method 800 for implementing a composite program 112 with modification. In the description of FIG. 8, reference is made to elements of FIGS. 1-5 for simplicity of illustration. In an embodiment, the method 800 may be implemented by an exemplary computing system 118. It is understood that additional steps can be provided before, during, and after the steps of the method 800, and that some of the steps described can be replaced or eliminated for other embodiments of the method 800.

At block 802, the computing system 118 receives a composite program 112 such as discussed above with respect to block 602.

At block 804, the computing system 118 customizes the augmented compiler 130 based on the one or more parameters specified in the metaprogram 114 of the composite program 112, such as discussed above with respect to block 604.

At block 806, the augmented compiler 130 outputs the compiled code—e.g., as compiled code 202 as illustrated in FIGS. 2-3, as discussed above with respect to block 608.

At block 808, the computing system 118 runs one or more AI/ML algorithms on the compiled code to determine one or more parameters to modify in order to better optimize the augmented compiler 130 for a given hardware environment/space. For example, the metaprogram 114 when received by computing system 118 may include one or more inputs that the augmented compiler 130 incorporates for compiling. The AI/ML algorithm(s) may analyze the compiled code output and, based on one or more analytical passes made on the output, make one or more changes to the metaprogram 114 being implemented by the augmented compiler 130. The augmented compiler 130 may then implement the changes and re-compile the object code 116. The AI/ML algorithm(s) may continue iterating through changes until a desired level of optimization is achieved for the given object code 116 for a given target (e.g., a targeted hardware environment), or a specified number of times (to name a few examples).

In some other examples, the AI/ML algorithm(s) may be run on the composite program 112 before compilation by the augmented compiler 130. In such examples, instead of the metaprogram 114 specifying one or more particular parameters to be implemented by the augmented compiler 130, the metaprogram 114 may identify one or more outcome goals for compiled code by the augmented compiler 130. In such situations, the AI/ML algorithm(s) may apply one or more analytics on the specified outcome goals to determine what parameter(s) to modify for the augmented compiler 130. The AI/ML algorithm(s) may use as data inputs the information included with the metaprogram 114, one or more parameters about the hardware environment(s) targeted, one or more parameters about the augmented compiler, as well as past data from other compiled code, to name a few examples. Further, the AI/ML algorithm may implement one or more algorithms to achieve its results.

The dashed lines used for block 808 in FIG. 8 are to convey that the use of an AI/ML algorithm(s) may be optional. Where the AI/ML algorithm(s) is included, it may run automatically (including making changes to one or more metaprogram 114 parameters); alternatively, a user may be prompted to accept proposed changes first, or even to allow the AI/ML algorithm(s) to run.

Where the AI/ML algorithm(s) is not included, a developer/programmer may assess the performance of compiled code in a target environment and manually modify one or more parameters specified within the metaprogram 114 (e.g., via the development environment at developer system 102). For example, a developer may implement a just-in-time (JIT) compilation for the augmented compiler 130 (which may include, in some examples, the developer system 102 performing a first compilation of the source code into an intermediate representation, such as byte code, as the object code 116). The developer may compile the object code 116 via JIT compilation in the augmented compiler 116, assess the performance results, and made modification(s) to the metaprogram 114 and then JIT compile the byte code again with the modifications to the metaprogram 114 being implemented by the augmented compiler 130. The developer may instead use AOT compilation to assess the performance results and make modification(s) to the metaprogram 114.

However one or more modifications to the metaprogram 113 are made, at block 810 the augmented compiler 130 of computing system 118 receives the updated metaprogram 810, the updates being based on the results of the compiled code and analysis. The method 800 then may loop back to block 804 to customize the augmented compiler 130 based on the updated parameter(s) in the metaprogram 114, and proceed as further laid out above (which may include looping back again after another round of adjustment, or not if a target threshold of performance is achieved, or a target number of iterations have occurred, etc.).

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   providing a first generic compiler configured to receive second code instructions at a metaprogram level;
   editing, by a computing device, a program code of the first generic compiler based on one or more code transformation instructions to create a second compiler, the one or more code transformation instructions contained in the second code instructions, the second code instructions being part of a composite computer program that further comprises first code instructions at an object program level;
   compiling, by the computing device, the first code instructions using the second compiler to produce a transformed set of code for the computing device; and
   executing, by the computing device, at least part of a computer program from the composite computer program based on the transformed set of code.

2. The method of claim 1, further comprising:
   compiling, by the computing device, the transformed set of code using a third compiler to produce a second transformed set of code.

3. The method of claim 2, wherein the second transformed set of code comprises a set of machine code, and
   the executing based on the transformed set of code comprises executing the set of machine code.

4. The method of claim 1, wherein the transformed set of code is transformed by the second compiler based on a specified hardware configuration of the computing device based on the second code instructions.

5. The method of claim 1, wherein the editing further comprises:
   producing, by the computing device executing the second code instructions, a plurality of alternative transformation results of a combination of transformations for the first generic compiler to implement; and
   pruning, by the computing device executing the second code instructions, one or more of the plurality of alternative transformation results using a cost measure.

6. The method of claim 1, further comprising:
   receiving, by the computing device, a manual modification to one or more parameters specified in the second code instructions; and
   repeating the editing, compiling, and executing according to the manual modification.

7. The method of claim 1, further comprising:
   implementing, by the computing device executing the composite computer program, an artificial intelligence (AI) algorithm to determine one or more parameters to transform the first code instructions based on a particular hardware platform;
   modifying, automatically by the computing device, the determined one or more parameters specified in the second code instructions; and
   repeating the editing, compiling, and executing according to the modification.

8. The method of claim 7, further comprising:
receiving, by the computing device, one or more outcome goals as the second code instructions for the artificial intelligence (AI) algorithm implementation.

9. The method of claim 1, wherein the one or more code transformation instructions contained in the second code instructions comprises at least one of constant folding, monomorphization, or list fusion.

10. A computing device, comprising:
a memory containing machine readable medium comprising machine executable code having stored thereon instructions for performing a method of implementing a composite computer program, the composite computer program comprising first code instructions at an object program level and second code instructions at a metaprogram level; and
a processor coupled to the memory, the processor configured to execute the machine executable code to cause the processor to:
provide a first generic compiler configured to receive the second code instructions;
edit a program code of the first generic compiler of the computing device based on one or more code transformation instructions to create a second compiler, the one or more code transformation instructions contained in the second code instructions;
compile the first code instructions using the second compiler to produce a transformed set of code for the computing device; and
execute at least a part of a computer program from the composite computer program based on the transformed set of code.

11. The computing device of claim 10, wherein the processor is further configured to compile the transformed set of code using a third compiler to produce a second transformed set of code.

12. The computing device of claim 11, wherein the transformed set of code comprises a set of machine code, and the execution of at least the part of the computer program comprises execution of the set of machine code.

13. The computing device of claim 10, wherein the transformed set of code is transformed by the second compiler based on a specified hardware configuration of the computing device based on the second code instructions.

14. The computing device of claim 10, wherein the processor is further configured, as part of the editing, to:
produce a plurality of alternative transformation results of a combination of transformations for the first generic compiler to implement; and
prune one or more of the plurality of alternative transformation results using a cost measure.

15. The computing device of claim 10, wherein the processor is further configured to:
receive a manual modification to one or more parameters specified in the second code instructions; and
repeat the editing, compilation, and execution according to the manual modification.

16. The computing device of claim 10, wherein the processor is further configured to:
implement an artificial intelligence (AI) algorithm to determine one or more parameters to transform the first code instructions based on a particular hardware platform;
modify, automatically by the computing device, the determined one or more parameters specified in the second code instructions; and
repeat the editing, compilation, and execution according to the modification.

17. The computing device of claim 16, wherein the processor is further configured to:
receive one or more outcome goals as the second code instructions for the artificial intelligence (AI) algorithm implementation.

18. A non-transitory computer-readable medium having program code recorded thereon, the program code comprising:
code for causing a computing device to provide a first generic compiler configured to receive second code instructions at a metaprogram level;
code for causing the computing device to edit a program code of the first generic compiler with one or more code transformation instructions to create a second compiler, the one or more code transformation instructions contained in the second code instructions, the second code instructions being part of a composite computer program that further comprises first code instructions at an object program level;
code for causing the computing device to compile the first code instructions using the second compiler to produce a transformed set of code for the computing device; and
code for causing the computing device to execute at least a part of a computer program from the composite computer program based on the transformed set of code.

19. The non-transitory computer-readable medium of claim 18, wherein the transformed set of code is transformed by the second compiler based on a specified hardware configuration of the computing device based on the second code instructions.

20. The non-transitory computer-readable medium of claim 18, further comprising:
code for causing the computing device to receive one or more outcome goals as the second code instructions for an artificial intelligence (AI) algorithm implementation;
code for causing the computing device to implement an artificial intelligence (AI) algorithm to determine one or more parameters to transform the first code instructions based on a particular hardware platform, based on the received one or more outcome goals;
code for causing the computing device to automatically modify the determined one or more parameters specified in the second code instructions; and
code for causing the computing device to repeat the editing, compilation, and execution according to the modification.

* * * * *